United States Patent
Liu et al.

(10) Patent No.: US 12,306,901 B2
(45) Date of Patent: May 20, 2025

(54) OPERATION ACCELERATOR, PROCESSING METHOD, AND RELATED DEVICE

(71) Applicant: Huawei Technologies Co., Ltd., Shenzhen (CN)

(72) Inventors: Hu Liu, Shenzhen (CN); Bin Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1015 days.

(21) Appl. No.: 17/224,643

(22) Filed: Apr. 7, 2021

(65) Prior Publication Data
US 2021/0224125 A1 Jul. 22, 2021

Related U.S. Application Data

(63) Continuation of application No. PCT/CN2018/109543, filed on Oct. 9, 2018.

(51) Int. Cl.
*G06F 17/16* (2006.01)
*G06F 17/15* (2006.01)

(52) U.S. Cl.
CPC ............ *G06F 17/16* (2013.01); *G06F 17/153* (2013.01)

(58) Field of Classification Search
CPC ..... G06F 17/15–153; G06F 17/16; G06F 7/76
See application file for complete search history.

(56) References Cited

U.S. PATENT DOCUMENTS

| 11,687,764 B2 * | 6/2023 | Shafiee Ardestani .. G06N 3/063 706/41 |
| 2016/0062947 A1 | 3/2016 | Chetlur et al. |
| 2017/0103318 A1 | 4/2017 | Ross et al. |

(Continued)

FOREIGN PATENT DOCUMENTS

| CN | 105843591 A | 8/2016 |
| CN | 106445471 A | 2/2017 |

(Continued)

OTHER PUBLICATIONS

Vasudevan et al., "Parallel Multi Channel Convolution using General Matrix Multiplication", 2017 IEEE 28th International Conference on Application-Specific Systems, Architectures and Processors (ASAP), Jul. 3, 2017, pp. 19-24 (Year: 2017).*

(Continued)

*Primary Examiner* — Matthew D Sandifer
(74) *Attorney, Agent, or Firm* — Slater Matsil, LLP

(57) ABSTRACT

An operation accelerator, a processing method, and a related device, the operation accelerator including a first memory configured to store an input dataset, a matrix converter configured to perform reading M row vectors from the input dataset, generating a first instruction, and sending the M row vectors and the first instruction to a second memory configured to perform, according to the first instruction, pre-processing on the M row vectors to obtain n row vectors, and storing the n row vectors, where the n row vectors include the M row vectors and (n−M) padding row vectors, the n row vectors are N row vectors in a target matrix, and a storage sequence of the n row vectors in the second memory is consistent with a sequence of the N row vectors in the target matrix.

19 Claims, 17 Drawing Sheets

(56) References Cited

U.S. PATENT DOCUMENTS

| | | | | |
|---|---|---|---|---|
| 2018/0300613 A1* | 10/2018 | Petre | ............... | G06F 9/3887 |
| 2019/0114499 A1* | 4/2019 | Delaye | ............ | G06F 3/0656 |
| 2019/0163716 A1* | 5/2019 | Li | ................. | G06N 20/10 |
| 2019/0164037 A1* | 5/2019 | Kim | ................ | G06N 3/04 |

FOREIGN PATENT DOCUMENTS

| | | |
|---|---|---|
| CN | 106940815 | 7/2017 |
| CN | 106970896 A | 7/2017 |
| CN | 108171327 A | 6/2018 |
| CN | 108205702 A | 6/2018 |
| JP | 2018120549 A | 8/2018 |

OTHER PUBLICATIONS

Wang. X. et al., "Accelerationg CNN on mobile GPU", Computer Engineering & Science, Jan. 2018, 6 Pages, vol. 40, No. 1.

Anderson, A. et al., "Low memory GEMM-based convolution algorithms for deep neural networks", arXIV: 1709.03395v1 [cs.CV], Sep. 8, 2017, 14 pages.

* cited by examiner

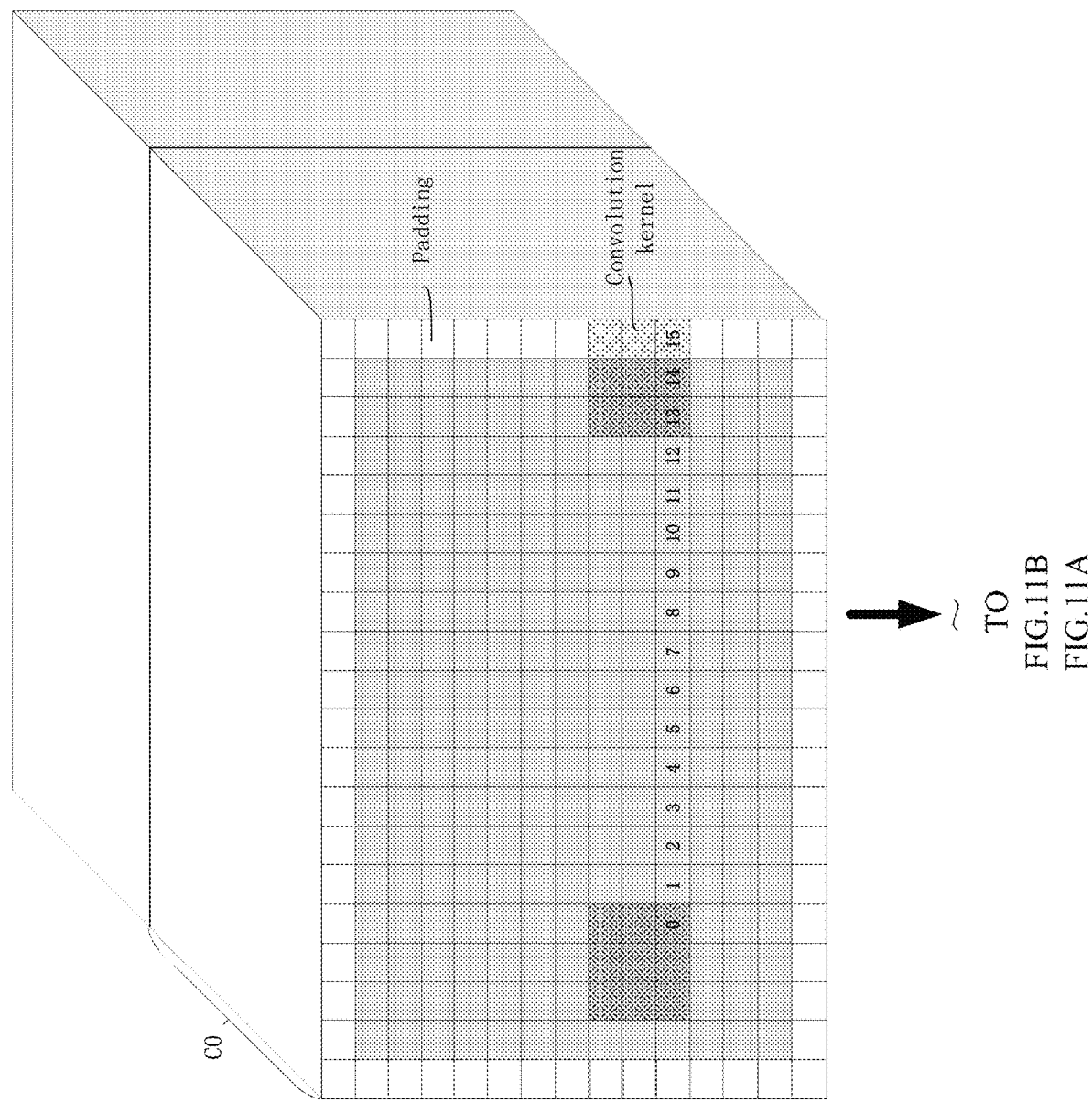

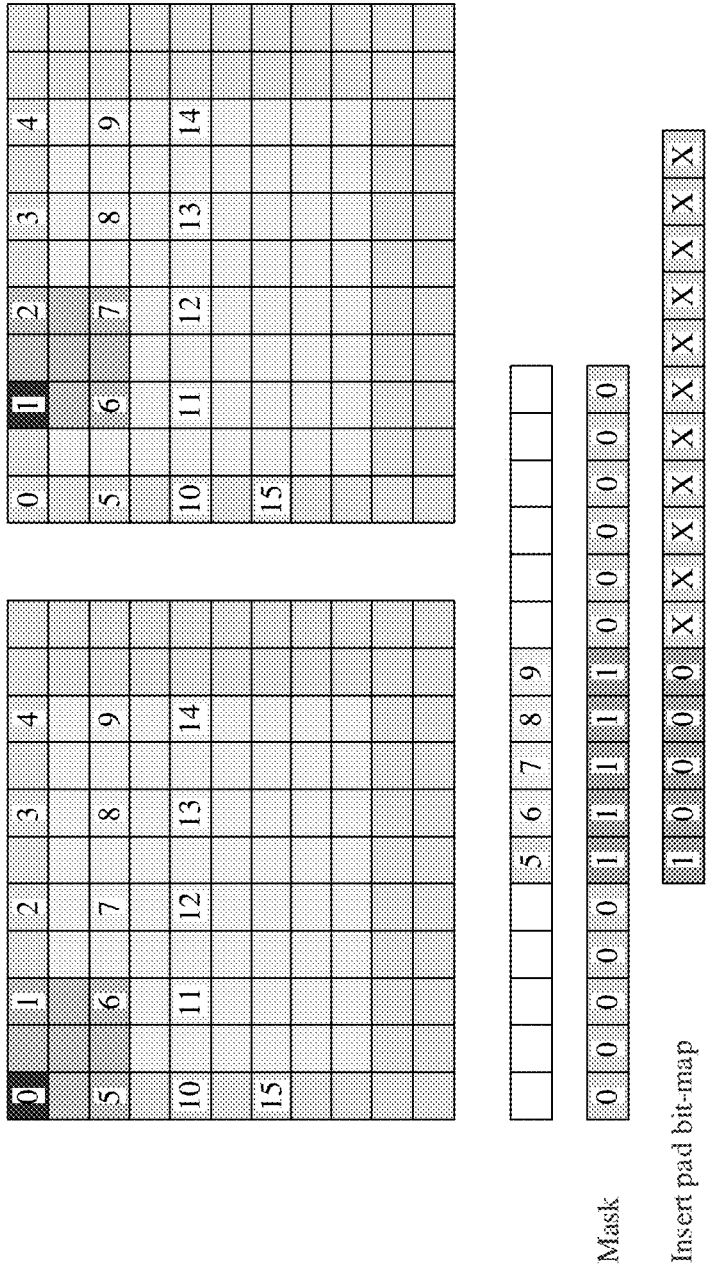

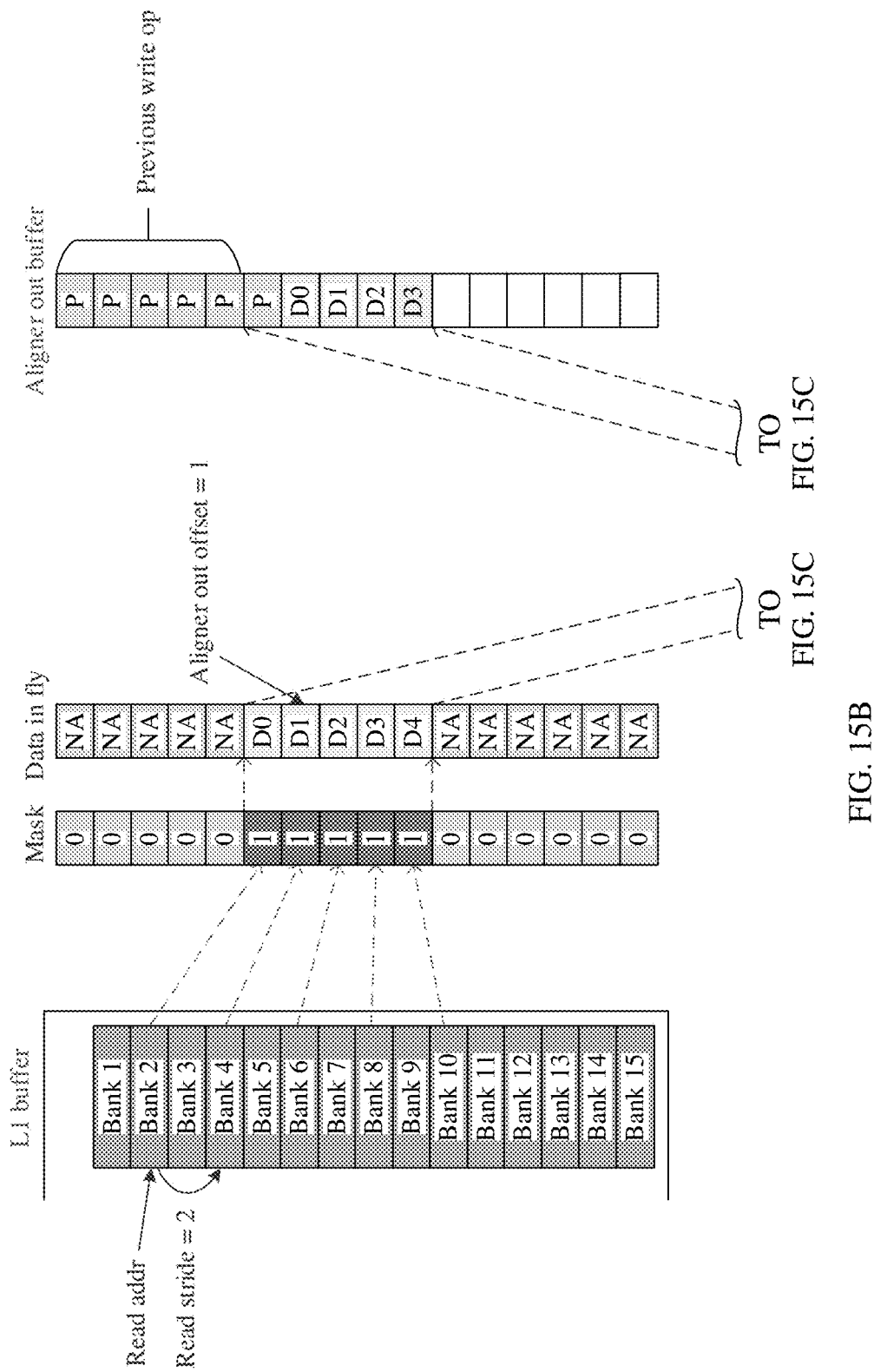

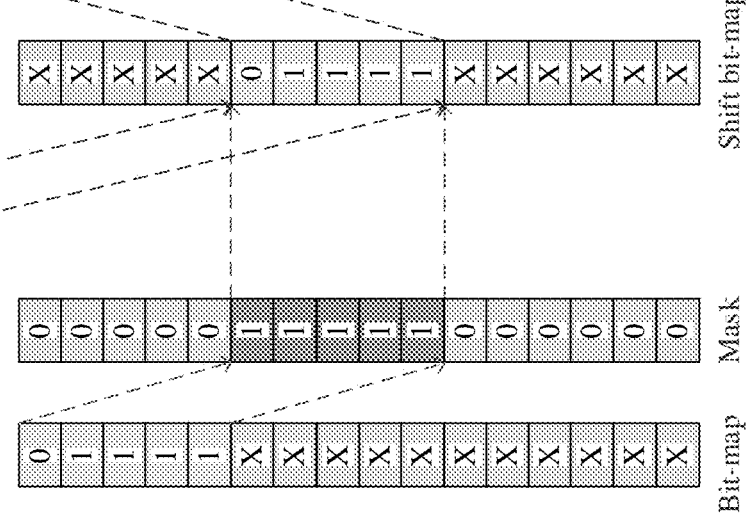

OPERATION ACCELERATOR, PROCESSING METHOD, AND RELATED DEVICE

CROSS-REFERENCE TO RELATED APPLICATIONS

This application is a continuation of International Application No. PCT/CN2018/109543, filed on Oct. 9, 2018, the disclosure of which is hereby incorporated by reference in its entirety.

TECHNICAL FIELD

This application relates to data processing technologies in the artificial intelligence field, and in particular, to an operation accelerator, a processing method, and a related device.

BACKGROUND

In recent years, with breakthroughs in technologies such as deep neural networks, heterogeneous computing, high bandwidth and high storage density, big data, and cloud computing, application of artificial intelligence has developed rapidly, ubiquitous in public life. Currently, a large part of artificial intelligence calculation is operation of various neural networks, and a convolution operation occupies most calculation amount and data throughput of an entire neural network.

As various artificial intelligence (AI) devices are widely used, AI acceleration is urgently required by cloud-based big data analysis and computing. There are increasingly higher requirements on neural network computing, in particular, on a computing capability and computing efficiency of convolution.

A main component of a convolutional neural network is the convolution operation, and the convolution operation accounts for more than 95% of calculation amount of the entire convolutional neural network. Currently, a mainstream calculation manner of the convolution operation is to convert a convolution operation of a 3D convolution input dataset and a 3D weight parameter dataset into multiplication between two matrices. However, when the two matrices are relatively large, there may be problems of insufficient matrix buffer space, inflexible calculation, and low calculation efficiency. Therefore, how to improve convolution operation efficiency and significantly improve application of a neural network algorithm becomes an urgent problem to be resolved.

SUMMARY

Embodiments of the present invention provide an operation accelerator, a processing method, and a related device, to improve operation efficiency of a convolutional neural network.

According to a first aspect, embodiments of the present invention provide an operation accelerator, which may include a matrix converter, and a first memory and a second memory coupled to the matrix converter. The first memory is configured to store an input dataset, and the input dataset includes S row vectors. Each of the S row vectors includes C0 pieces of data, and the C0 pieces of data are data that is corresponding to an element $A_{ij}$ in an input feature map and that is on C0 consecutive channels in a C direction. A size of the input feature map is W*H*C, W is a width, H is a height, and C is a quantity of channels. $A_{ij}$ is an element in an $i^{th}$ row and a $j^{th}$ column on a W*H plane of the input feature map, i is a positive integer less than or equal to W, and j is a positive integer less than or equal to H. The matrix converter is configured to perform the following actions, including reading M row vectors from the input dataset, and generating a first instruction, where the M row vectors are M row vectors in a target matrix, a size of the target matrix is N*C0, N row vectors in the target matrix are row vectors corresponding to N elements Aj, when a convolution kernel continuously slides on the W*H plane of the input feature map for N times, that are corresponding to an element $W_{mn}$ in the convolution kernel and that are on the W*H plane, $W_{mn}$ is an element in an $m^{th}$ row and an $n^{th}$ column in the convolution kernel, the first instruction includes an instruction for performing preprocessing on the M row vectors, and the preprocessing includes one or more of sliding, concatenation, and padding, where M is an integer less than or equal to S, N is an integer greater than or equal to M, and C0 is an integer less than or equal to C, and sending the M row vectors and the first instruction to the second memory. The second memory performs, according to the first instruction, the preprocessing on the M row vectors to obtain n row vectors, and stores the n row vectors. The n row vectors include the M row vectors and (n−M) padding row vectors, the n row vectors are the N row vectors in the target matrix, and a storage sequence of the n row vectors in the second memory is consistent with a sequence of the N row vectors in the target matrix.

In the embodiments of the present invention, a split small matrix, namely, the target matrix, is obtained by performing the preprocessing (including the one or more of sliding, concatenation, and padding) on data in the input feature map. Only a part of data is converted and stored in a buffer at a time. A large matrix operation is divided into small matrix operations to resolve an insufficient buffer problem. In addition, conversion and calculation can be performed at the same time, thereby resolving dependency between conversion and calculation processes. Further, because of a data splitting manner and a matrix operation manner provided in the embodiments of the present invention, data reuse can be maximally implemented. For example, a weight matrix memory may be updated only after operations on all target matrices stored in the first memory are completed. In addition, because in the embodiments of the present invention, a row vector in the target matrix on which an operation is performed is divided from the C direction of a channel by using a fixed length C0, when a small matrix of N*C0 is generated, element discreteness that is of the matrix and that is in a W direction and an H direction is reduced to discreteness in only the H direction. This reduces a probability of a conflict generated when the data in the feature map is read from the first memory, and improves original data reading performance.

In a possible implementation, when N is greater than M, the N row vectors in the target matrix are specifically row vectors corresponding to N elements Aj, when the convolution kernel continuously slides on a padded W*H plane of the input feature map for N times, that are corresponding to the element $W_{mn}$ in the convolution kernel and that are on the padded W*H plane. That the second memory is configured to perform, according to the first instruction, the preprocessing on the M row vectors to obtain n row vectors, and store the n row vectors specifically includes padding the (n−M) padding row vectors with fixed values, and performing, according to the first instruction, a sliding or concatenation operation on the M row vectors and the (n−M) padding row vectors to obtain the n row vectors, and storing the n row vectors.

In the embodiments of the present invention, a problem that bandwidth and storage space are occupied for transmitting padding by the input dataset of the feature map is resolved by using an online padding manner.

In a possible implementation, the operation accelerator further includes a third memory coupled to the matrix converter, and an operation circuit coupled to the third memory. The matrix converter is further configured to send, to the third memory for P times, the n row vectors stored in the second memory and a corresponding second instruction generated by the matrix converter, where P is an integer greater than or equal to 1, and the second instruction includes a write enable, a write address, and a write size. The third memory is configured to store P*n row vectors according to the corresponding second instruction, and send the P*n row vectors to the operation circuit, where a storage sequence of n row vectors that are received at each time in the n row vectors received for the P times and that are in the third memory is consistent with a sequence of the corresponding N row vectors in the target matrix, and storage sequences of the n row vectors that are received for the P times and that are in the third memory are consistent with receiving sequences. The operation circuit is configured to perform matrix operations on the P*n row vectors.

In the embodiments of the present invention, a plurality of target matrices are generated through conversion in the second memory, and are sequentially sent to the third memory. Finally, the third memory may perform the related matrix operations on the P*n row vectors at a time. When there are a plurality of rounds of conversion and operations, the operations and the conversion may be performed at the same time, thereby improving operation efficiency.

In a possible implementation, the S row vectors are data corresponding to consecutive S pieces of $A_{ij}$ on the C0 consecutive channels in the C direction, and the S pieces of $A_{ij}$ are first in a W direction and then in an H direction in the input feature map.

In a possible implementation, that the matrix converter is configured to read M row vectors from the input dataset, and generate a first instruction specifically includes reading the M row vectors from the S row vectors according to a read instruction, where the read instruction includes a read enable, a read address, a read stride, and a read size, and the read stride is equal to a sliding stride of the convolution kernel.

In the embodiments of the present invention, when reading the M row vectors, the matrix converter generates, based on the elements included in the target matrix, micro-ops including the read enable, the read address, the read stride, and the read size, to read, from the first memory, the related row vectors used to generate the target matrix.

In a possible implementation, the matrix converter is further configured to perform, based on the n row vectors stored in the second memory and the first instruction, a reverse operation on the n row vectors to obtain the M row vectors through restoration, where the reverse operation includes one or more of sliding, splitting, and de-padding, and restore locations of the M row vectors in the S row vectors according to the read instruction for reading the M row vectors from the input dataset, where the read instruction includes the read enable, the read address, the read stride, and the read size.

In the embodiments of the present invention, the matrix converter may restore locations of the n row vectors in the original input dataset by using the first instruction and the n row vectors, to perform a convolution reverse operation. According to the embodiments of the present invention, two convolution conversion operations forward conversion and reverse conversion are implemented in a hardware structure.

According to a second aspect, this application provides a data processing method, including reading M row vectors from an input dataset, where the input dataset includes S row vectors, each of the S row vectors includes C0 pieces of data, and the C0 pieces of data are data that is corresponding to an element Aij in an input feature map and that is on C0 consecutive channels in a C direction, where a size of the input feature map is W*H*C, W is a width, H is a height, and C is a quantity of channels, Aij is an element in an $i^{th}$ row and a $j^{th}$ column on a W*H plane of the input feature map, i is a positive integer less than or equal to W, and j is a positive integer less than or equal to H, and the M row vectors are M row vectors in a target matrix, a size of the target matrix is N*C0, N row vectors in the target matrix are row vectors corresponding to N elements $A_{ij}$, when a convolution kernel continuously slides on the W*H plane of the input feature map for N times, that are corresponding to an element $W_{mn}$ in the convolution kernel and that are on the W*H plane, and $W_{mn}$ is an element in an $m^{th}$ row and an $n^{th}$ column in the convolution kernel, where M is an integer less than or equal to S, N is an integer greater than or equal to M, and C0 is an integer less than or equal to C, and performing preprocessing on the M row vectors to obtain n row vectors, where the preprocessing includes one or more of sliding, concatenation, and padding, the n row vectors include the M row vectors and (n−M) padding row vectors, the n row vectors are the N row vectors in the target matrix, and a storage sequence of the n row vectors in the second memory is consistent with a sequence of the N row vectors in the target matrix.

In a possible implementation, when N is greater than M, the N row vectors in the target matrix are specifically row vectors corresponding to N elements $A_{ij}$, when the convolution kernel continuously slides on a padded W*H plane of the input feature map for N times, that are corresponding to the element $W_{mn}$ in the convolution kernel and that are on the padded W*H plane.

The performing preprocessing on the M row vectors to obtain n row vectors includes padding the (n−M) padding row vectors with fixed values, and obtaining the n row vectors after the sliding or concatenation is performed on the M row vectors and the (n−M) padding row vectors.

In a possible implementation, the S row vectors are data corresponding to consecutive S pieces of $A_{ij}$ on the C0 consecutive channels in the C direction, and the S pieces of $A_{ij}$ are first in a W direction and then in an H direction in the input feature map.

In a possible implementation, the reading the M row vectors from an input dataset includes reading the M row vectors from the S row vectors according to a read instruction, where the read instruction includes a read enable, a read address, a read stride, and a read size, and the read stride is equal to a sliding stride of the convolution kernel.

In a possible implementation, the method further includes performing a reverse operation on the n row vectors to obtain the M row vectors through restoration, where the reverse operation includes one or more of sliding, splitting, and de-padding, and restoring locations of the M row vectors in the S row vectors according to the read instruction for reading the M row vectors from the input dataset, where the read instruction includes the read enable, the read address, the read stride, and the read size.

According to a third aspect, this application provides a neural network processor. The neural network processor may include the operation accelerator according to any one of the first aspect.

According to a fourth aspect, this application provides a system on chip. The system on chip may include the operation accelerator provided in any implementation of the first aspect and another discrete device coupled to the operation accelerator.

According to a fifth aspect, this application provides an operation acceleration system. The operation acceleration system includes a processor, an operation accelerator, and a memory. The operation accelerator invokes, under control of the processor, data in the memory, to implement a function of the operation accelerator in any one of the first aspect and implementations.

BRIEF DESCRIPTION OF THE DRAWINGS

FIG. 11A and FIG. 11B are a schematic diagram of generating a target matrix according to an embodiment of the present invention;

FIG. 15A, FIG. 15B, and FIG. 15C are a two-dimensional planar diagram of a process in which a 3D dataset is converted into a matrix according to an embodiment of the present invention;

DETAILED DESCRIPTION OF ILLUSTRATIVE EMBODIMENTS

Figure 1:
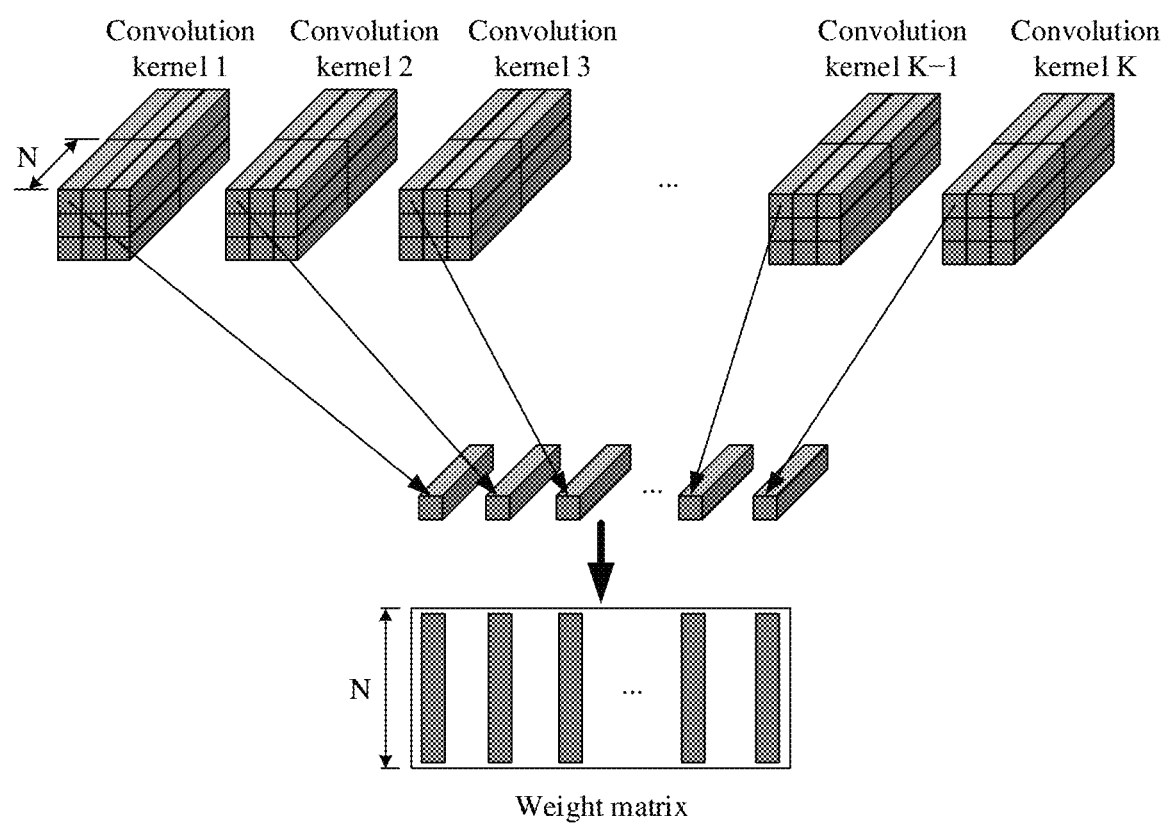
FIG. 1 is a schematic diagram of converting a convolution kernel into a weight matrix in the prior art.

The following describes embodiments of the present invention with reference to the accompanying drawings in the embodiments of the present invention.

In the specification, claims, and accompanying drawings of this application, the terms "first", "second", "third", "fourth" and so on are intended to distinguish between different objects but do not indicate particular order. In addition, the terms "including", "having", or any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by persons skilled in the art that the embodiments described in the specification may be combined with another embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

Some terms in this application are first described, to help persons skilled in the art have a better understanding.

(1) Artificial intelligence (AI) is a theory, a method, a technology, or an application system that simulates, extends, and expands human intelligence by using a digital computer or a machine controlled by a digital computer, to sense an environment, obtain knowledge, and achieve an optimal result by using the knowledge. In other words, the artificial intelligence is a branch of computer science, and is intended to understand essence of intelligence and produce a new intelligent machine that can react in a manner similar to the human intelligence. The artificial intelligence is to study design principles and implementation methods of various intelligent machines, to enable the machines to have perception, inference, and decision-making functions. Researches in the artificial intelligence field include a robot, natural language processing, computer vision, decision-making and inference, human-computer interaction, recommendation and search, an AI basic theory, and the like.

(2) A convolutional neural network (CNN) is a multilayer neural network. Each layer includes a plurality of two-dimensional planes, and each plane includes a plurality of independent neurons. A plurality of neurons of each plane share a weight, and a quantity of parameters on the neural network may be reduced through weight sharing. Currently, in the convolutional neural network, performing a convolution operation by a processor is usually converting convolution of an input signal feature and a weight into a matrix multiplication operation between a feature map matrix and a weight matrix.

(3) Convolution is an operation between a convolution kernel and an input matrix of a convolutional layer. Usually, an input matrix is a matrix extracted from an image matrix based on a stride of the convolution kernel during convolution. The convolution kernel is a small window that records a weight. The convolution kernel slides on the image matrix based on the stride. Each time the convolution kernel slides, one sub-matrix of the image matrix is corresponding to the convolution kernel. Weight values in the convolution kernel are multiplied by values included in the sub-matrix and then are added. A result is assigned to an element corresponding to a feature map matrix (output matrix) in which the convolution kernel is currently located.

(4) A stride that a convolution kernel moves along a height direction of an image matrix for one time is a stride that the convolution kernel slides in the height direction. A stride that the convolution kernel moves along a width direction of the image matrix for one time is a stride that the convolution kernel slides in the width direction. A sliding stride of the convolution kernel is represented by a parameter stride. Usually, an input matrix is extracted from the image matrix (namely, input data) based on a stride of the convolution kernel during convolution. For example, a stride is equal to [s1,s2], where s1 indicates the stride that the convolution kernel slides in the height direction, and s2 indicates the stride that the convolution kernel slides in the width direction.

(5) Padding a pixel: Because a matrix obtained after convolution becomes smaller (for example, for a convolutional network including 100 layers, a final picture obtained after each layer is scaled down is a very small picture), an edge pixel of an image matrix may be calculated for only one time, and an intermediate pixel is calculated through convolution for a plurality of times. This means that corner information of an image is lost. To solve these two problems, padding is performed on an input image, that is, the pixel is padded, to maintain boundary information. The padding can also be used to supplement input images with different sizes, so that the sizes of the input images are the same. In addition, an input dimension and an output dimension of the convolutional layer can be consistent.

Next, a technical problem that needs to be resolved and an application scenario in this application are proposed. In recent years, with good performance of a convolutional neural network in image classification, image recognition, audio recognition, and other related fields, the convolutional neural network becomes a research and development hotspot in the academic and industrial circles. The convolutional neural network mainly includes a convolution operation and a fully-connected (fully connected, FC) operation. An operation amount of the convolution operation usually accounts for more than 70% of an operation amount of the entire network.

The convolution operation is not equivalent to a matrix multiplication operation in a strict sense. However, the convolution operation may be converted into the matrix multiplication operation through proper data adjustment. There is usually a plurality of convolution kernels in the convolutional neural network. The convolution kernel is three-dimensional and includes three dimensions of data. Directions x and y represent a length and a width of the data, and a direction z may be considered as a depth of the data. The convolution kernel is actually a filter, and is mainly configured to extract different features from an image. Referring to FIG. 1, a convolution kernel is substantially a combination of a series of weights. It is assumed that there are K convolution kernels. N elements in a direction z at a same location in each of the K convolution kernels are extracted, so that an N*K weight matrix can be obtained. The convolution kernel may be prestored in a memory of a matrix multiplier in a form of a weight matrix based on a specification (to be specific, a row quantity and a column quantity of the matrix that can be calculated by the matrix multiplier) of the matrix multiplier, so that the convolution kernel is invoked when the matrix multiplier performs a matrix multiplication operation. In the embodiments of the present invention, "*" represents "multiplication".

Figures 2, 3:
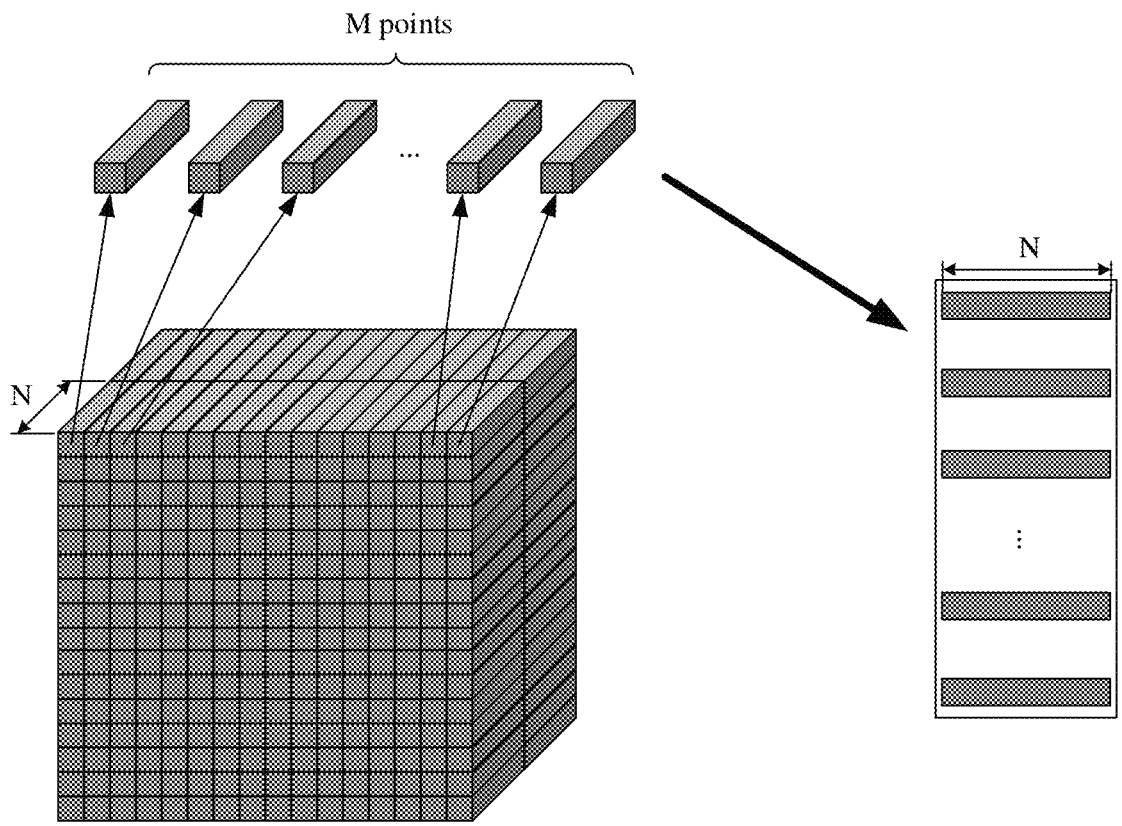
FIG. 2 is a schematic diagram of converting input data into an input matrix in the prior art.
FIG. 3 is a schematic diagram of a method for performing a multiplication operation on two matrices in the prior art.

Refer to FIG. 2. Based on a stride (in this embodiment of the present invention, the stride is 1) of the convolution kernel, the matrix multiplier may extract N pieces of data of M input points in the direction z, namely, a total of M*N pieces of data. An input matrix may be formed. The matrix multiplier needs to perform a multiplication operation on the input matrix and the weight matrix.

The FC operation is substantially a multiplication operation of a vector and a matrix. An input of the FC operation is a 9216 vector, and the FC needs to output 4096 points. In this case, to obtain a point output by the FC, a point multiplication operation needs to be performed on a 9216 vector and 9216 weights, and to obtain all 4096 points, a point multiplication operation needs to be performed on the 9216 vector and 9216×4096 weights.

FIG. 3 shows a calculation formula of a matrix C=A*B, where A is a matrix of a size of M*K, and B is a matrix of a size of K*N. In this embodiment of the present invention, M, N, and K each are a positive integer. To obtain one piece of data in the matrix C through calculation, a point multiplication operation needs to be performed on data in a row vector in the matrix A and corresponding data in a column vector in the matrix B, and then accumulation is performed. In other words, to obtain one piece of data in the matrix C through calculation, N multiplication operations need to be performed. In this case, to obtain the matrix C through calculation, M*N*K multiplication operations need to be performed.

Figure 4:
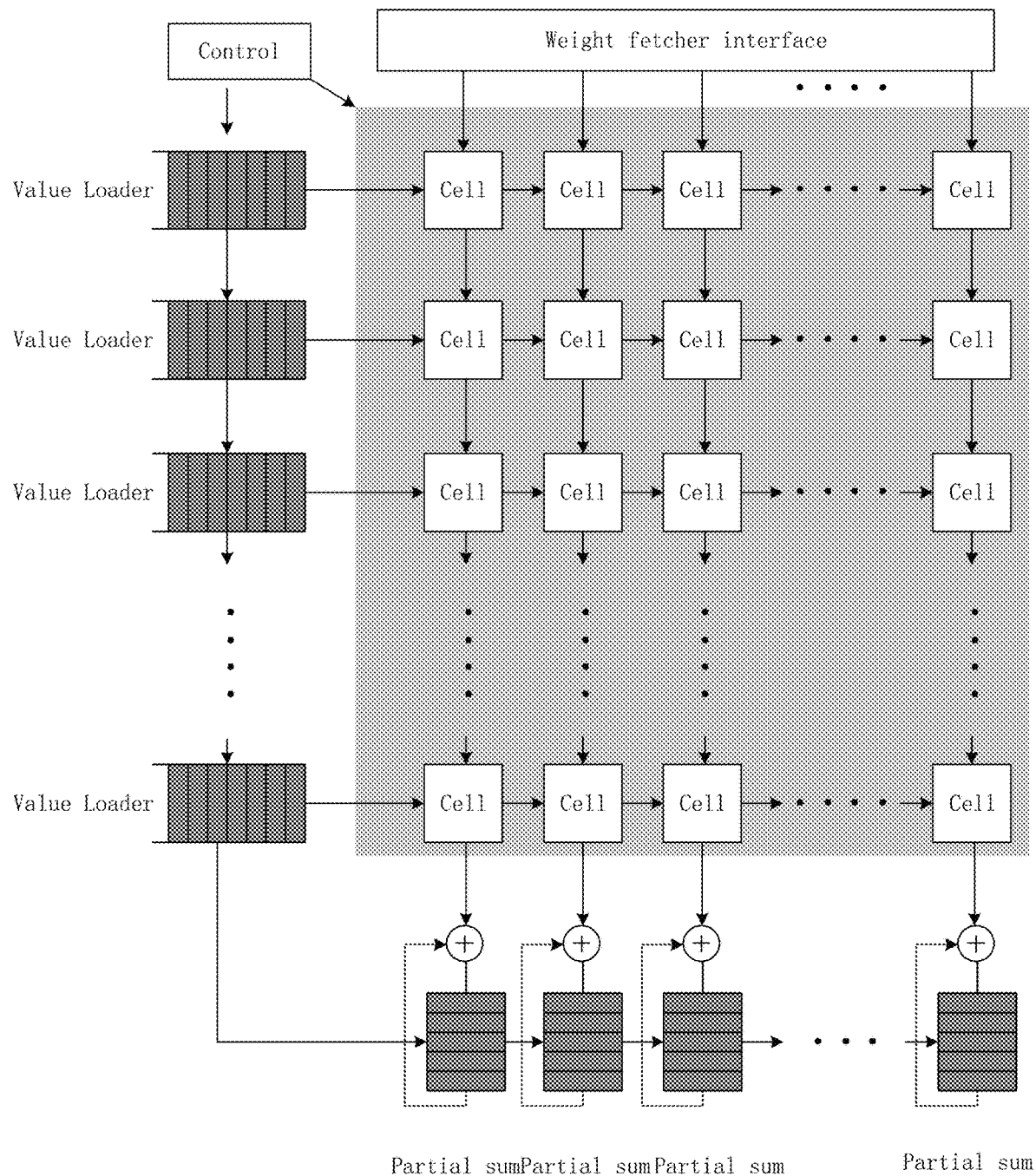
FIG. 4 is a schematic diagram of a TPU systolic array in the prior art.

In the prior art, a systolic array computing manner, for example, a dedicated chip (application specific integrated circuit, ASIC) Google TPUv1 customized by Google for machine learning, a tensor processing unit (TPU) uses a systolic array design to optimize a matrix multiplication operation and a convolution operation by using a 256×256 2-D MAC array (as shown in FIG. 4). A value loader of each row and a weight fetcher interface of each column in the figure transmit data to an intermediate cell (computation unit) matrix in a systolic mode. Each cell in the figure is a multiplier. After the multiplier multiplies elements in two matrices, a result (Partial Sum, that is, an intermediate result in matrix multiplication) obtained through calculation is transmitted down to an accumulation unit in the lower part of the figure, and is accumulated with a previous related accumulated value. In this way, when data is run in a full load state, the systolic array accumulates an intermediate value of a size of a matrix in each clock cycle.

Figure 5:
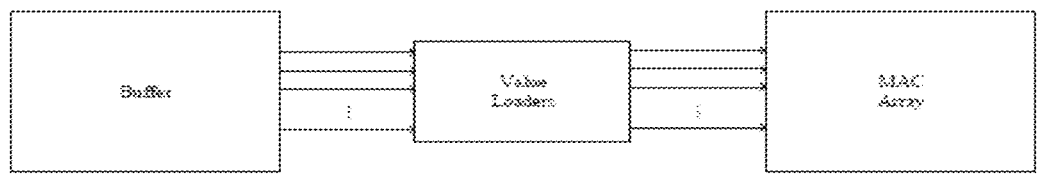
FIG. 5 is a schematic structural diagram of a TPU in the prior art.
Figure 6:
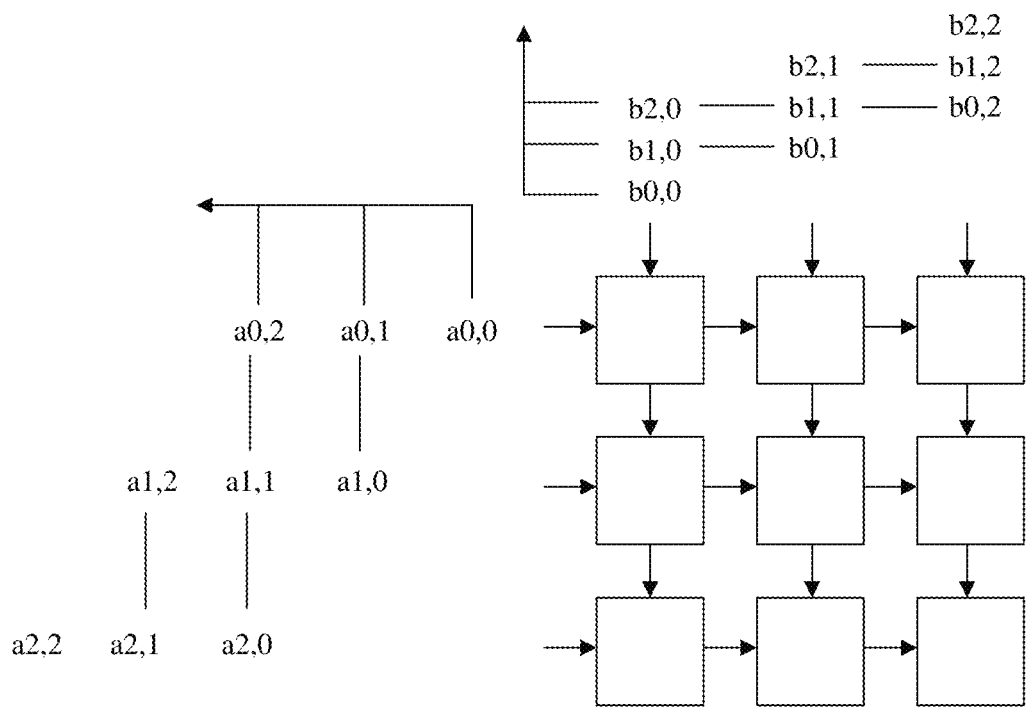
FIG. 6 is a schematic structural diagram of a 3×3 2D systolic array in the prior art.

In this solution, matrix conversion and matrix multiplication of a dataset are combined. Elements of an input dataset are selected by the value loader and then transferred to a cell matrix. An overall structure is shown in FIG. 5. To better understand a manner of calculating a matrix by using a two-dimensional systolic array, a 3×3 systolic array is used as an example below. FIG. 6 is a schematic structural diagram of a 3×3 2D systolic array in the prior art.

As shown in FIG. 6, in a first clock cycle, results that are obtained through calculation by inputting a matrix A[0,0] and a matrix B[0,0] to a first multiplier (where all expressions of [x,y] represent an $x^{th}$ row and a $y^{th}$ column) are input to an accumulation unit in the lower part.

In a second clock cycle, a matrix A[0,1] and a matrix B[1,0] are input to the first multiplier to calculate a second intermediate value that is obtained by multiplying a first row of the matrix A and a first column of the matrix B. The second intermediate value is input to the accumulation unit, and the second intermediate value and a first intermediate value calculated in the previous clock cycle are accumulated. At the same time, the previous input A[0,0] enters a second multiplier on the right, and performs, with a newly input B[0,1], an intermediate value operation between a first row of the matrix A and a second column of the matrix B. Similarly, B[0,0] enters a second multiplier in the lower part, and performs, with a newly input A[1,0], an intermediate value operation between a second row of the matrix A and a first column of the matrix B.

In the foregoing solution, matrix conversion of an input dataset is strongly coupled to a multiply and accumulate (MAC) computation unit. Data obtained through matrix conversion is directly hardwired to the computation unit, and flexibility of a matrix operation is low. During matrix multiplication, because systolic arrays need to be transferred to a cell matrix one by one in an initial stage, a size of a large matrix is required to achieve a pipeline execution effect. A calculation dimension is relatively fixed and inflexible. Calculation efficiency of a 256×256 2D systolic array on a small matrix is not high. In addition, a reverse process of converting the matrix into a 3D dataset cannot be implemented.

Therefore, a technical problem to be resolved in this application is to design an operation accelerator to perform calculation on a large quantity of data operations in a convolutional neural network in an efficient, flexible, and low energy manner. This includes the following manners. The matrix conversion of the input dataset is decoupled from the MAC computation unit, to solve problems of low flexibility of a hardware structure design and a low data reuse rate. An NC1HWC0 data structure is designed to solve a problem of low efficiency in processing small matrices in a TPU architecture by splitting a matrix converted from the input dataset into small matrices. Padding data is designed to be generated online, to solve a problem that bandwidth and storage space are occupied for transmitting padding by an input dataset of a feature map.

It may be understood that the operation accelerator provided in the embodiments of the present invention may be applied to fields such as machine learning, deep learning, and a convolutional neural network, or may be applied to fields such as digital image processing and digital signal processing, or may be applied to other fields related to a matrix multiplication operation.

Figure 7:
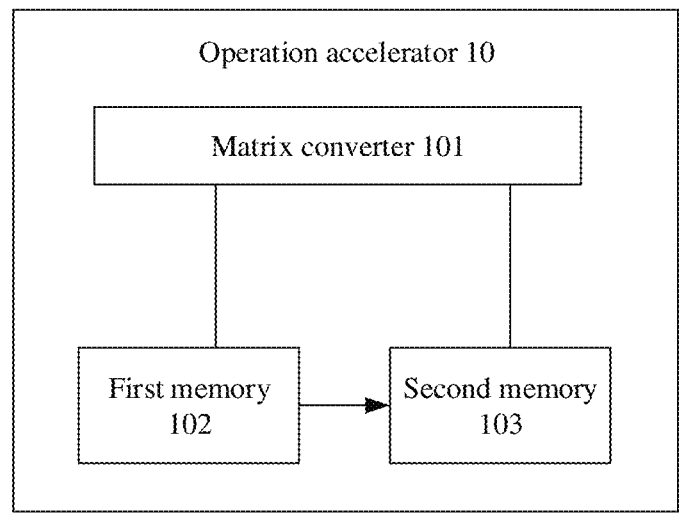
FIG. 7 is a structural diagram of an operation accelerator according to an embodiment of the present invention.
Figure 8:
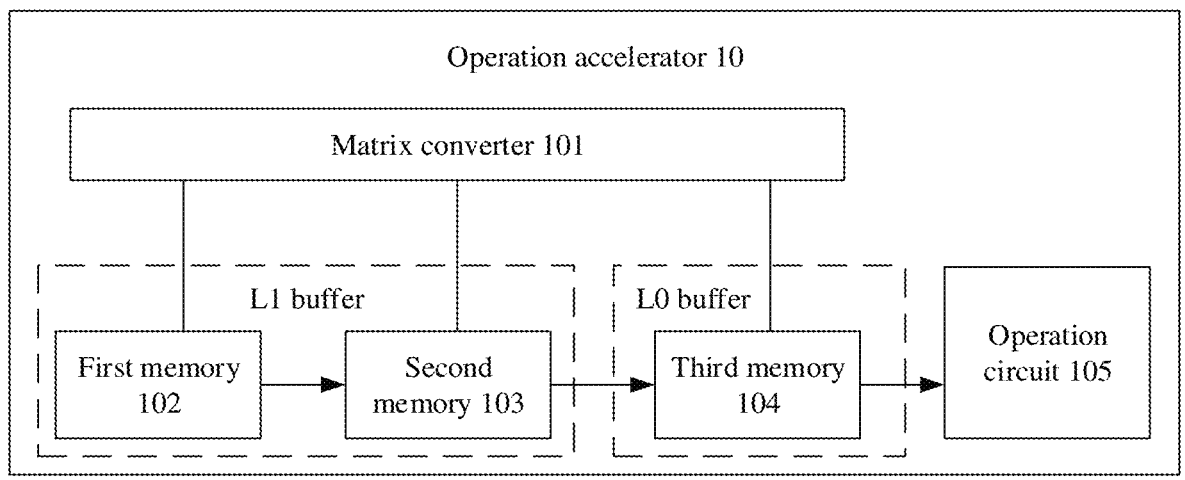
FIG. 8 is a structural diagram of another operation accelerator according to an embodiment of the present invention.

Based on the foregoing analysis, this application provides an operation accelerator, to specifically analyze and resolve the technical problem proposed in this application. FIG. 7 is a structural diagram of an operation accelerator according to an embodiment of the present invention. As shown in FIG. 7, the operation accelerator 10 includes a matrix converter 101, and a first memory 102 and a second memory 103 that are coupled to the matrix converter 101. Optionally, FIG. 8 is a structural diagram of another operation accelerator according to an embodiment of the present invention. The operation accelerator 10 may further include a third memory 104 and an operation circuit 105. The matrix converter 101 may perform data communication with the first memory 102, the second memory 103, and the third memory 104 through a bus, or may form a small system for direct communication. The operation circuit 105 is configured to extract matrix data in the third memory 104 and a weight matrix in another related memory, to perform a vector multiplication operation, a vector addition operation, and the like.

The first memory 102 is configured to store an input dataset. The input dataset includes S row vectors. Each of the S row vectors includes C0 pieces of data. The C0 pieces of data are data that is corresponding to an element $A_{ij}$ in an input feature map and that is on C0 consecutive channels in a C direction. A size of the input feature map is W*H*C. W is a width, H is a height, and C is a quantity of channels. $A_{ij}$ is an element in an $i^{th}$ row and a $j^{th}$ column on a W*H plane of the input feature map. i is a positive integer less than or equal to W, j is a positive integer less than or equal to H, and C0 is an integer less than or equal to C. It may be understood that elements that are in the S row vectors and that are in a same column are on a W*H plane corresponding to a same channel. In a possible implementation, the S row vectors are data corresponding to consecutive S pieces of $A_{ij}$ on the C0 consecutive channels in the C direction, and the S pieces of $A_{ij}$ are first in a W direction and then in an H direction in the input feature map.

Figure 9:
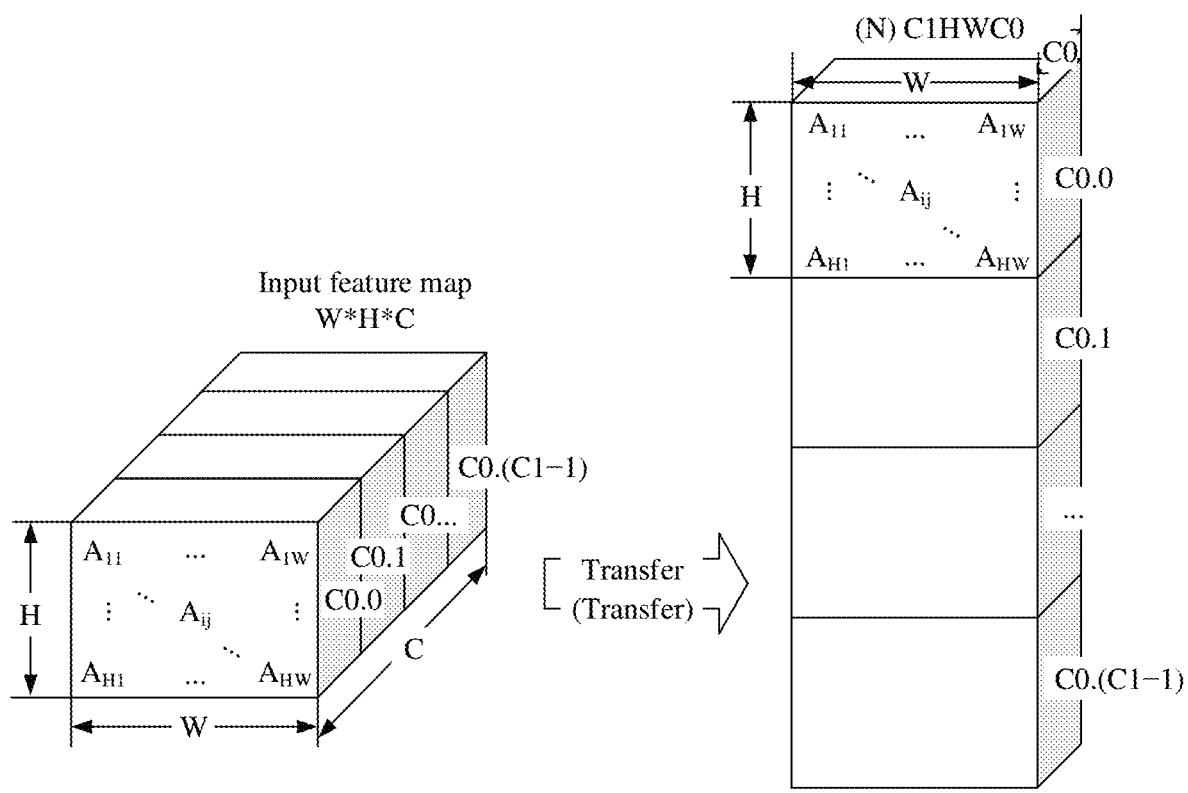
FIG. 9 is a storage manner of an input feature map according to an embodiment of the present invention.

For example, FIG. 9 is a storage manner of an input feature map according to an embodiment of the present invention. In FIG. 9, a data structure obtained after the input feature map is converted is named NC1HWC0. It is assumed that the input feature map is a 3D matrix of the dimension of W*H*C shown in FIG. 9. The input feature map is split into pieces of C0 (for example, 16 channels or 4 channels) with a fixed length in a channel direction. The pieces of C0 are named C0.0, C0.1, C0.2, C0.3, . . . , C0. (C1−1), totaling C1 pieces. For C0.0 in each 3D matrix block after splitting, for example, C0.0, is a convolutional layer whose layer size C0 is W*H. If a quantity of entire channels is not an integer multiple of C0, padding may be performed at the tail, so that the quantity of entire channels is the integer multiple of C0. Finally, in FIG. 9, a quantity of channels of the input feature map is channel=C0×C1, where C1 is an integer. Optionally, the input feature map may be stored in a sequence of C0.0→W→H→C0.0→W→H→ . . . →C0.(C1−1). N herein means that N input feature maps may be formed by a plurality of input feature maps.

With reference to FIG. 9, an input dataset in this embodiment of the present invention may be a row vector including C0 channels corresponding to some or all of $A_{ij}$ in one or more of the foregoing input feature maps. It is assumed that C0 is equal to 4, if S row vectors are data corresponding to consecutive S pieces of $A_{ij}$ (first in a W direction and then in an H direction) that are in a W*H plane of a matrix block C0.0 and that are on C0 consecutive channels in a C direction, the S row vectors may be row vectors corresponding to $A_{11}$, $A_{12}$, $A_{13}$, $A_{14}$, . . . , $A_{1w}$, $A_{21}$, $A_{22}$, $A_{23}$, and the like in the W*H plane of the matrix block C0.0. A row vector corresponding to an element $A_{22}$ in a second row and a second column is data corresponding to $A_{22}$ on four consecutive channels in the C direction, which is {$A_{22-1}$, $A_{22-2}$, $A_{22-3}$, $A_{22-4}$}. It may be understood that column sequences that are of data of channels and that are in row vectors may be arranged in ascending order, in descending order, or based on a preset value. Elements that are located in a same column and that are in the S row vectors are on a W*H plane corresponding to a same channel.

The matrix converter 101 is a hardware function module including control logic and an arithmetic unit, and is configured to generate related micro-ops of Img2Col or Col2Img. Specifically, the matrix converter 101 is configured to perform the following actions reading M row vectors from the input dataset, and generating a first instruction, where the M row vectors are M row vectors in a target matrix, a size of the target matrix is N*C0, N row vectors in the target matrix are row vectors corresponding to N elements $A_{ij}$, when a convolution kernel continuously slides on a W*H plane of the input feature map for N times, that are corresponding to an element $W_{mn}$ in the convolution kernel and that are on the W*H plane, $W_{mn}$ is an element in an $m^{th}$ row and an $n^{th}$ column in the convolution kernel, the first instruction includes an instruction for performing preprocessing on the M row vectors, and the preprocessing includes one or more instructions of sliding, concatenation, and padding, where M is an integer less than or equal to S, and N is an integer greater than or equal to M, and sending the M row vectors and the first instruction to the second memory. In this embodiment of the present invention, a target matrix is an N*C0 matrix including C0 pieces of data corresponding to $A_{ij}$ on which an operation is performed with a weight element after the weight element in the convolution kernel continuously slides, in a convolution process, for N times based on a fixed sliding stride. C0 pieces of data corresponding to one piece of $A_{ij}$ are one row vector in the target matrix. Optionally, an arrangement sequence of row vectors in the target matrix is consistent with a sliding sequence of convolution kernels.

In a possible implementation, the matrix converter 101 is configured to read M row vectors from the input dataset, and generate a first instruction specifically includes reading the M row vectors from the S row vectors according to a read instruction. The read instruction includes a read enable, a read address, a read stride, and a read size. The read stride is equal to a sliding stride of the convolution kernel. Specifically, the M row vectors are read from the S row vectors, and need to be read based on an element specifically included in the target matrix. In other words, corresponding micro-ops such as the read address, the read size, and the read stride need to be generated based on the element in the target matrix for reading the M row vectors. The read address may be obtained through calculation based on parameters given by a matrix conversion instruction delivered by a processor, including a size of the feature map, a sliding starting location of a current convolution kernel, a location of an element processed by the current convolution kernel, and a starting address of the feature map stored in an L1 memory. The read size may be determined based on a size of each row vector. The read stride may be determined based on the sliding stride of the convolution kernel. In addition, when N is greater than M, it indicates that there is a row vector with padding in the target matrix. When N is equal to M, it indicates that there is no row vector with padding in the target matrix.

The second memory 103 performs, according to the first instruction, the preprocessing on the M row vectors to obtain n row vectors, and stores the n row vectors. The n row vectors include the M row vectors and (n-M) padding row vectors. The n row vectors are the N row vectors in the target matrix. A storage sequence of the n row vectors in the second memory is consistent with a sequence of the N row vectors in the target matrix. Specifically, the second memory is configured to according to micro-ops (the first instruction) including one or more operations of sliding, concatenation, and padding, adjust, for the read M row vectors, a mapping relationship between a read address and a write address, and write the read address and the write address into corresponding locations. It should be noted that the n row vectors stored in the second memory are the N row vectors in the target matrix, and details are not described subsequently. Optionally, when (N-M) is greater than 0, it indicates that the padding needs to be performed. In this case, a fixed value needs to be used for padding first, and then the sliding or concatenation is performed. When (N-M) is equal to 0, it indicates that the padding does not need to be performed. In this case, only the sliding or concatenation needs to be performed. It may be understood that a sequence of a target matrix may be the same as a sequence of the M read row vectors. In this case, the foregoing operation does not need to be performed.

In a possible implementation, when N is greater than M, the N row vectors in the target matrix are specifically row vectors corresponding to N elements Aj, when the convolution kernel continuously slides on a padded W*H plane of the input feature map for N times, that are corresponding to the element $W_{mn}$ in the convolution kernel and that are on the padded W*H plane. That the second memory 103 is configured to perform, according to the first instruction, the preprocessing on the M row vectors to obtain n row vectors, and store the n row vectors specifically includes padding the (n-M) padding row vectors with fixed values, and performing, according to the first instruction, a sliding or concatenation operation on the M row vectors and the (n-M) padding row vectors to obtain the n row vectors, and storing the n row vectors. That is, the fixed value, for example, 0, is used for padding first based on a padding table.

Figure 10:
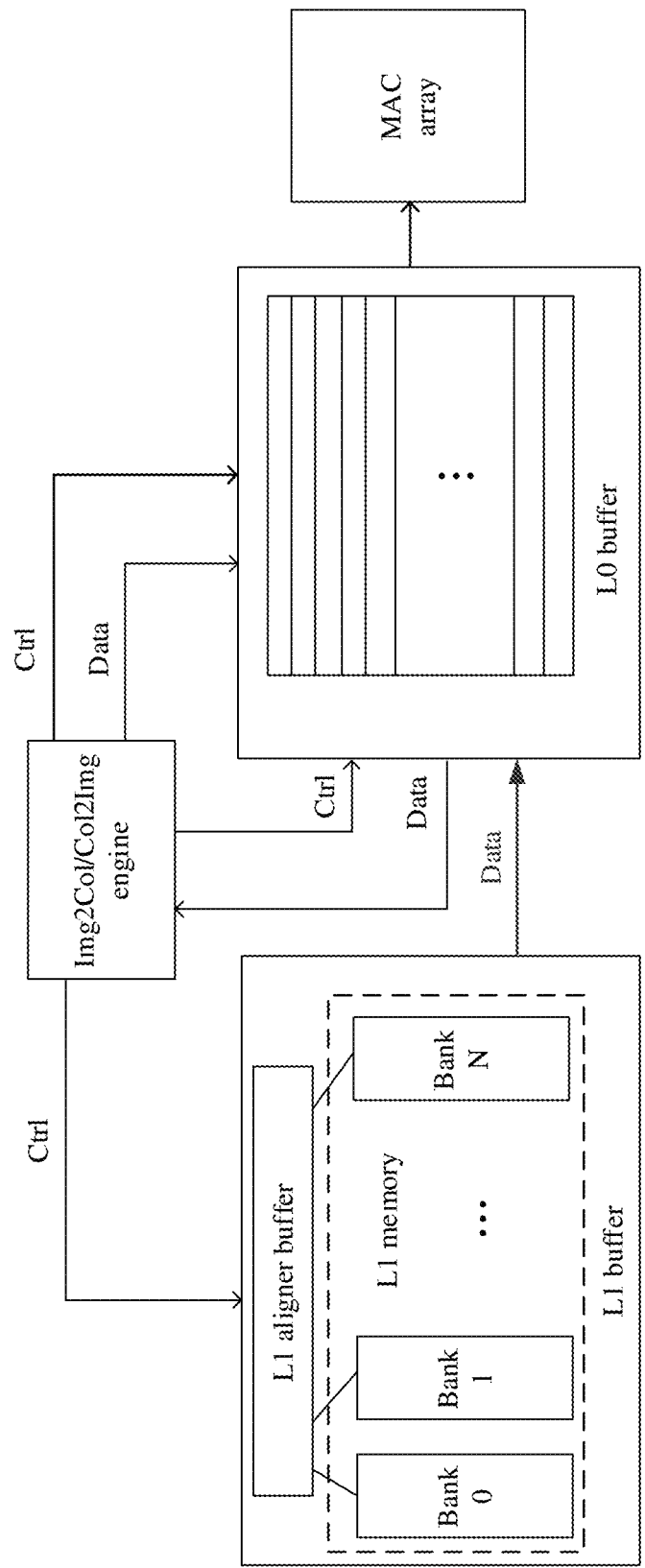
FIG. 10 is a schematic diagram of a detailed structure of an operation accelerator according to an embodiment of the present invention.
Figure 11B:
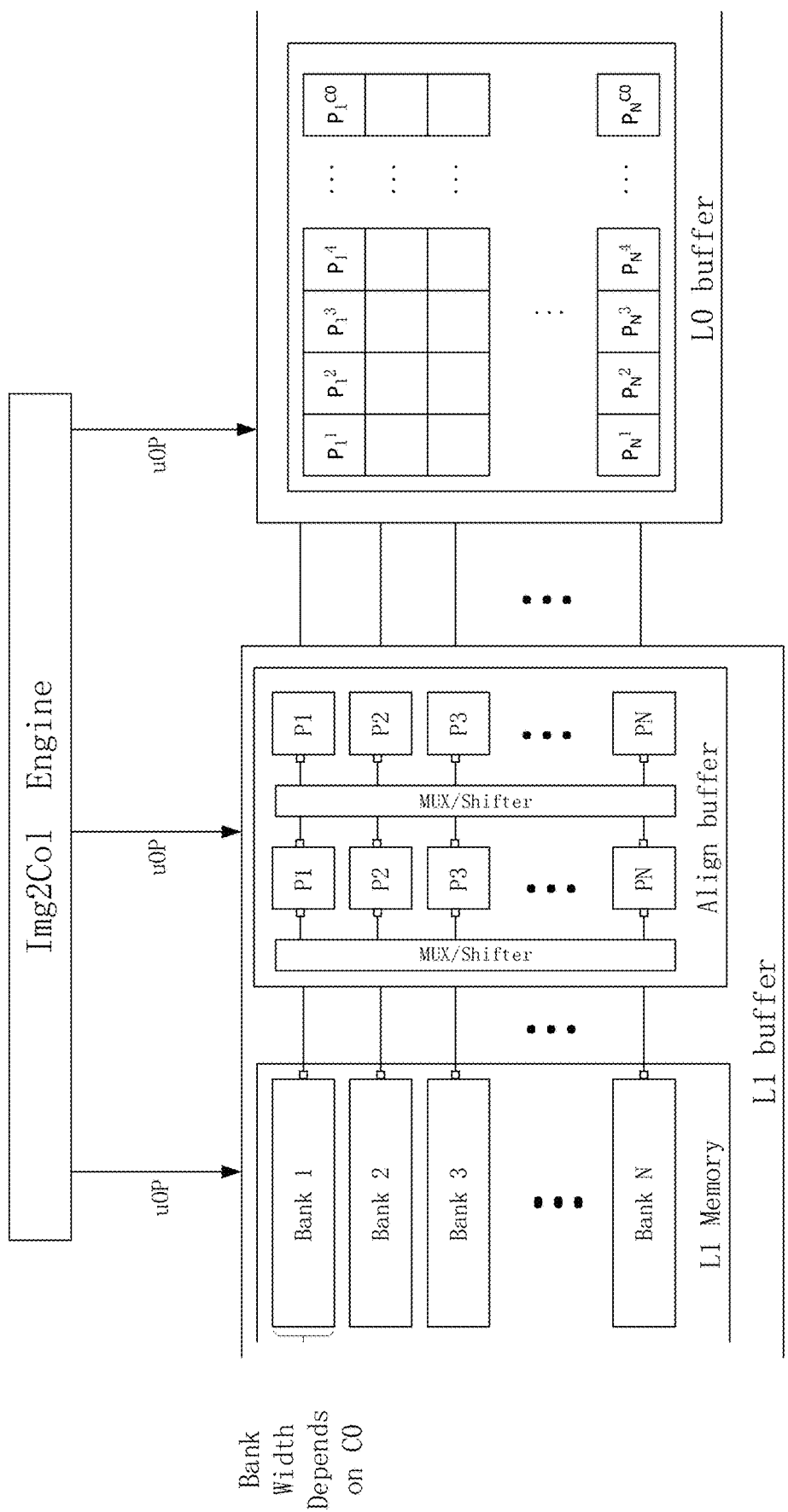

FIG. 10 is a schematic diagram of a detailed structure of an operation accelerator according to an embodiment of the present invention. An L1 memory is a first memory in this embodiment of the present invention. An L1 align buffer is a second memory in this embodiment of the present invention. An L0 buffer is a third memory in this embodiment of the present invention. Specifically, the L1 memory includes a plurality of storage units (bank). Each bank may be configured to store a row vector in this embodiment of the present invention. The align buffer includes a plurality of storage units P. Each P may be configured to store a row vector in this embodiment of the present invention. With reference to FIG. 10, FIG. 11A and FIG. 11B are a schematic diagram of generating a target matrix according to an embodiment of the present invention. It is assumed that an input feature map is W*H*C0, that is, C is equal to C0. A gray part is an original input feature map, and a white part is an input feature map obtained after a padding element (for example, 0) is padded. In this case, a size of the input feature map has changed to (W+2)*(H+2)*C0. As shown in FIG. 11A, on a W*H plane (including a padding part), it is assumed that a convolution kernel is a 3*3 weight matrix. The convolution kernel continuously slides on the W*H plane at a stride of 1. When $W_{33}$ slides on the W*H plane for 16 times, the 16 times are respectively corresponding to elements 0, 1, 2, 3, 4, 5, 6, 7, 8, 9, 10, 11, 12, 13, 14 and 15 on the W*H plane of the input feature map. An element in which 15 is located is a padding element. Therefore, M row vectors read by a matrix converter (Img2Col Engine) from an input dataset are row vectors corresponding to 0, 1, 2, 3, 4, 5, 6, 7, 8, 9, 10, 11, 12, 13 and 14. Content actually stored in the L1 memory includes the row vectors corresponding to 0 to 14. After conversion is performed by the matrix converter, a corresponding instruction is generated. The row vectors corresponding to 0 to 14 are read from the L1 memory, and padding replacement is performed on the 15$^{th}$ row vector. 15 is padded with 0, and the other 15 row vectors do not need to be replaced. Then, padded 15 is concatenated to the end of 14. N row vectors finally stored in the second memory are row vectors that are corresponding to elements and that are stored in a sequence of 0, 1, 2, 3, 4, 5, 6, 7, 8, 9, 10, 11, 12, 13, 14 and 15.

Optionally, the operation accelerator in this embodiment of the present invention further includes the third memory 104 and the operation circuit 105.

The matrix converter 101 is further configured to send, to the third memory for P times, the n row vectors stored in the second memory and a corresponding second instruction generated by the matrix converter. P is an integer greater than or equal to 1, and the second instruction includes a write enable, a write address, and a write size.

The third memory 104 is configured to store P*n row vectors according to the corresponding second instruction, and send the P*n row vectors (may be all sent at a time) to the operation circuit 105. A storage sequence, in the third memory, of n row vectors that are received at each time in the n row vectors received for the P times is consistent with a sequence of the corresponding N row vectors in the target matrix, and storage sequences, in the third memory, of the n row vectors that are received for P times are consistent with receiving sequences.

The operation circuit 105 may include X rows*Y columns*Z slices of operation units. Specifically, one operation unit may include a vector multiplication circuit and an addition circuit. The operation circuit 105 receives P*n pieces of row vector data sent by the third memory 104 and column vector data sent by a weight memory (not shown in the figure), and multiplies the two vectors. The addition circuit is configured to add a result of multiplying the two vectors, and accumulate a calculation result belonging to a same operation unit to obtain a calculation result of each operation unit.

Optionally, an operation size X*Y*Z of the operation circuit and a size N*C0 or (P*N)*C0 of the target matrix may be the same, or may be in an integer multiple relationship. In this way, a matrix operation may be exactly completed in one clock cycle or a plurality of clock cycles.

For example, for each input feature map of W*H*C0, a sliding window may slide for X times for a weight element $W_{mn}$ in the convolution kernel in an entire convolution process. It is assumed that X=P*N. For the weight element $W_{mn}$, actually, an operation needs to be performed with the weight element $W_{mn}$ and P*N corresponding row vectors in the input feature map. Therefore, in the second memory, the n row vectors that are converted and stored for a plurality of times (P times) are separately input to the third memory. The third memory may send, based on a size of the operation circuit and in one clock cycle or consecutive clock cycles, P*n row vectors that are sequentially stored to the operation circuit, to perform an operation with the P*n row vectors and corresponding $W_{mn}$. In this case, because the P*n row vectors are of the same weight element $W_{mn}$, $W_{mn}$ in the weight memory may remain unchanged in an operation period, and is not changed until an operation corresponding to another weight element $W_{mn}$ is performed. This reduces read/write overheads and improves efficiency.

The first memory 102, the second memory 103, the third memory 104, and another memory in this embodiment of the present invention may all be a register, a random access memory (RAM), a static random access memory, a flash memory, or another readable and writable memory. Optionally, the first memory 102 and the second memory 103 may be integrated into one memory as an L1 Buffer, and the third memory 104 is independently used as the L0 Buffer. For example, the operation accelerator 10 includes multi-level buffers. From the L0 buffer to the L1 buffer, the L2 buffer, and the like, a capacity increases, access bandwidth decreases, a delay increases, and power consumption overheads increase. That is, L0 is an innermost buffer, and may be directly connected to the operation circuit. This is not specifically limited in this embodiment of the present invention. Optionally, both the input dataset and a data type of each row vector in this application may be of a type, for example, int 8, fp16, fp32, or the like.

In this embodiment of the present invention, a problem of insufficient buffers is solved after a large matrix is divided into small blocks. Only a part of data is converted and stored in a buffer at a time. In addition, conversion and calculation can be performed at the same time, thereby resolving dependency between two processes, including the conversion and the calculation. Because of a 3D matrix splitting manner and a matrix operation manner provided in this embodiment of the present invention, data reuse can be maximally implemented. A weight matrix memory may be updated only after operations on all target matrices stored in the first memory are completed. In addition, because in the embodiments of the present invention, a row vector in the target matrix on which an operation is performed is divided from a C direction of a channel by using a fixed length C0, when a small matrix of N*C0 is generated, element discreteness that is of the matrix and that is in a W direction and an H direction is reduced to discreteness in only the H direction. This reduces a probability of a conflict generated when data in the feature map is read from the first memory, and improves original data reading performance.

In a possible implementation, the matrix converter is further configured to perform, based on the n row vectors stored in the second memory and a first instruction, a reverse operation on the n row vectors to obtain the M row vectors through restoration. The reverse operation includes one or more of sliding, splitting, and de-padding. The matrix converter is further configured to restore locations of the M row vectors in S row vectors according to a read instruction for reading the M row vectors from the input dataset. The read instruction includes a read enable, a read address, a read stride, and a read size. That is, the matrix converter may restore locations of the n row vectors in the original input dataset by using the first instruction and the n row vectors, to perform a convolution reverse operation. The convolution reverse operation is an important step of neural network training. In this embodiment of the present invention, two conversion operations: forward conversion and reverse conversion are implemented in a hardware structure.

Based on the foregoing structure of the operation accelerator, for example, the following describes how the operation accelerator in this embodiment of the present invention converts and stores the input feature map into the target matrix in the convolution process.

First, the L1 memory in the L1 buffer in the operation accelerator is divided into a quantity of banks based on a quantity of rows (for example, a quantity of rows is N) of the target matrix (small matrix). A bit width of a bank is directly divided based on a size of C0.

For example, bank num=matrix row num, that is, the quantity of banks is equal to the quantity of rows of the target matrix.

For example, bank width=C0*data width, that is, the bit width of the bank is equal to a width of C0.

In this way, one row of data of the target matrix (namely, the small matrix) may be read from one bank in one clock cycle, thereby resolving a problem of a read conflict that may be caused when one row of data is read in one clock cycle. In addition, data of N (N is a quantity of banks) rows may be read from N banks in one clock cycle without any read conflict. To be specific, if N is equal to a quantity of rows of the small matrix, and the convolution kernel continuously slides in the input feature map, one small matrix may be generated in one clock cycle. This well resolves a memory bound problem in a convolution operation.

The Img2Col engine (namely, the matrix converter) controls L1/L0 through micro-ops (uOP) to complete a process of converting a dataset into a matrix. The Img2Col engine generates, for the L1 memory of the L1 buffer, micro-ops of the read address, the read enable, the read size, and the read stride (read stride). These micro-ops are used to control data to be read from the L1 memory. Further, the Img2Col engine generates, for the align buffer of the L1 buffer, micro-ops, namely, the first instructions, such as sliding, concatenation, or replacement (including a padding replacement table). These micro-ops control adjustment of the data read from the L1 memory, to change an arrangement sequence of the data into an arrangement sequence of the row vectors in the target matrix. Finally, the Img2Col engine generates, for L0, micro-ops, namely, the second instructions such as the write enable, the write address, and the write size. These micro-ops complete a process of writing data in the align buffer to L0. The read address is for a non-padding address.

The following uses an example to describe how to read the data from the L1 memory and write the data into the align buffer.

Figure 12:
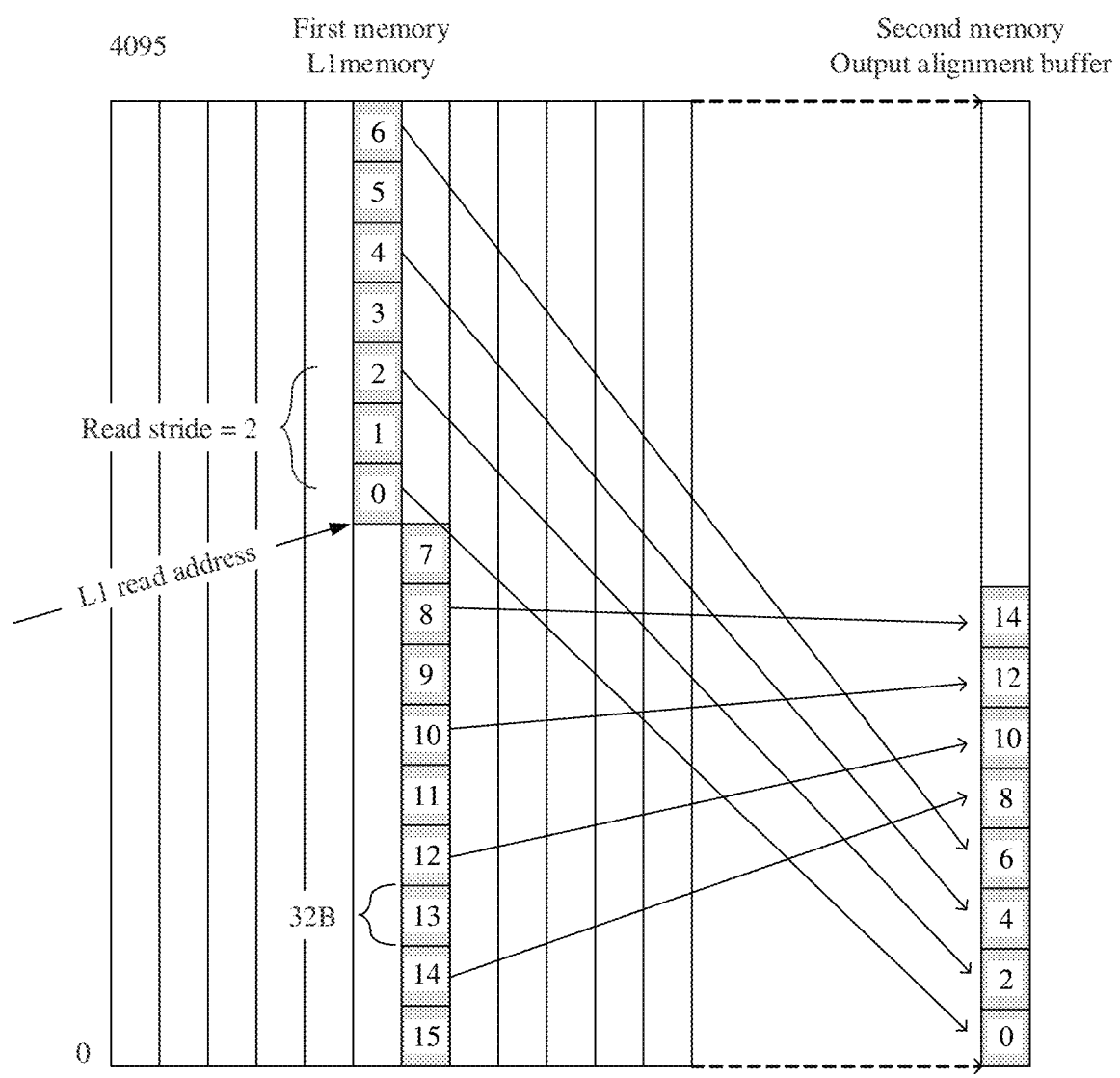
FIG. 12 is a schematic diagram of sliding, concatenation, or replacement according to an embodiment of the present invention.

As shown in the following FIG. 12, the data is read based on the read address, the read size, and the read stride, and then is transmitted to a level-1 buffer of the align buffer. In FIG. 12, it is assumed that the L1 memory stores row vectors corresponding to S consecutive elements A on an H*W plane of the input feature map, and a sliding stride of the convolution kernel is 2. Therefore, when a weight element in the convolution kernel slides for N times, an interval between N elements that are corresponding to the weight element and that are on the H*W plane of the input feature map is also the sliding stride of the convolution kernel. A storage sequence of the S row vectors in the L1 memory is shown in FIG. 12, and the S row vectors are corresponding to 0 to 15 row vectors.

Figure 13:
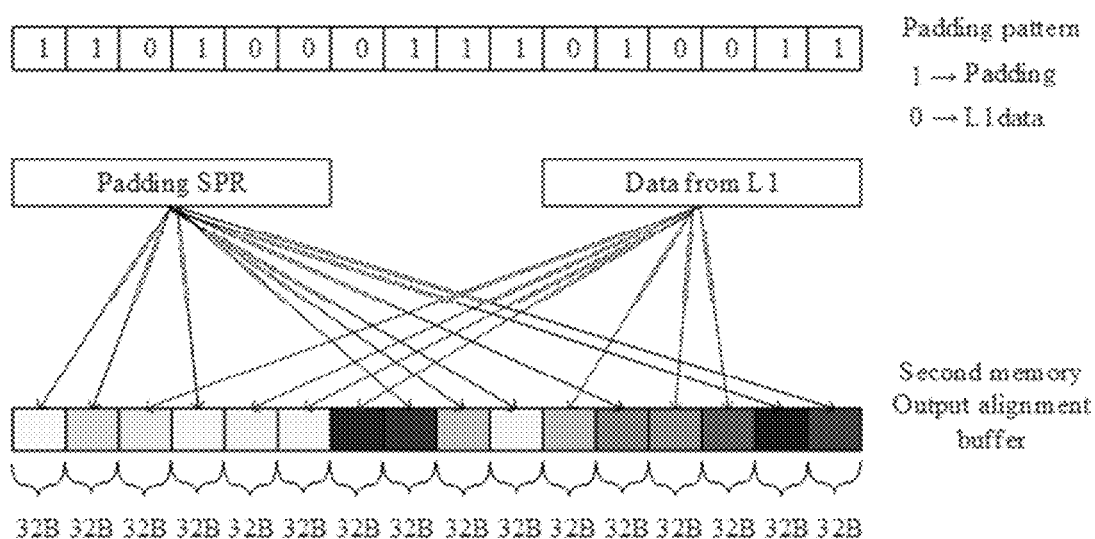
FIG. 13 is another schematic diagram of sliding, concatenation, or replacement according to an embodiment of the present invention.

When the data is transmitted to the level-1 buffer of the L1 align buffer, padding is replaced based on the padding replacement table. In the padding replacement table, 0/1 indicates whether the padding needs to be replaced. A maximum length is the quantity of rows of the target matrix. As shown in FIG. 13, a padding special-purpose register (SPR) is a register for storing a padding value, and may be configured by using a configuration instruction.

Figure 14:
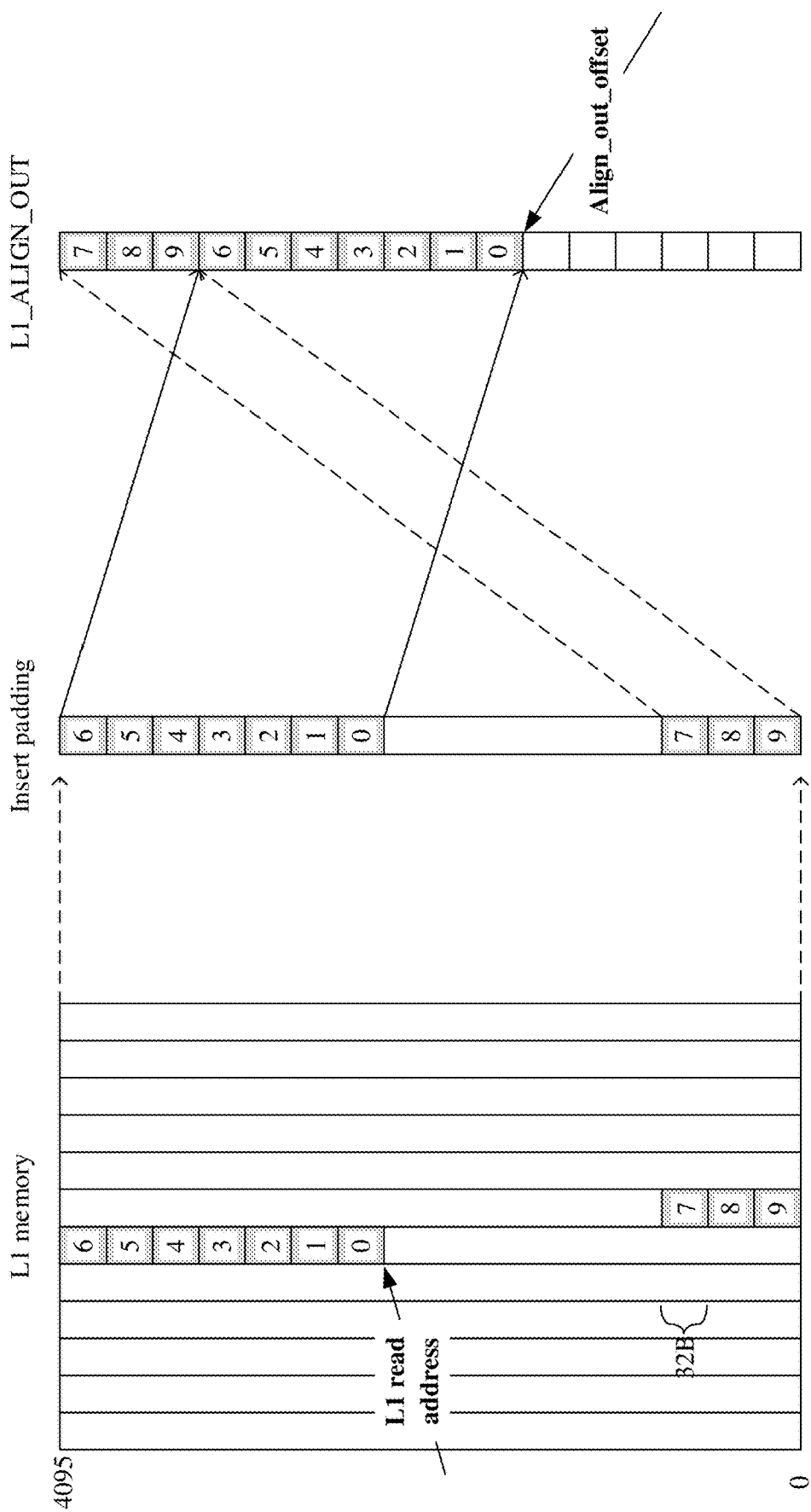
FIG. 14 is another schematic diagram of sliding, concatenation, or replacement according to an embodiment of the present invention.

Because currently read data may be a middle part or a tail part of the small matrix, when the data is transmitted to a level-2 buffer of the align buffer, the sliding and the concatenation are performed. For example, when a head part is the padding or the middle part is the padding, the data needs to be displaced to a correct location and concatenated with previously written data, to complete generation of the entire target matrix. As shown in FIG. 13, a location corresponding to 0 is padded with the data read from the L1 memory, and a location corresponding to 1 is padded with a padding element. As shown in FIG. 14, corresponding sliding and corresponding concatenation are performed.

After the generation of the entire small matrix is complete, the engine completes writing data to L0 by using the micro-ops of the write enable, the write address, and the write size.

FIG. 15A, FIG. 15B, and FIG. 15C are a two-dimensional planar diagram of a process in which a 3D dataset is converted into a matrix. A channel direction is hidden in the figure, that is, data corresponding to C0 channels following each block is not shown in the figure. Dark color parts around, including the $1^{st}$ row, the $10^{th}$ row, the $11^{th}$ row, the $1^{st}$ column, the $10^{th}$ column, and the $11^{th}$ column are padding, are not stored in the L1 memory, and exist only in a coordinate calculation process. Light color parts in the middle, including elements from the $2^{nd}$ row to the $9^{th}$ row, and elements from the $2^{nd}$ column to the $9^{th}$ column, are data of the feature map, and are continuously stored in a DDR/L1 in a W→H→C direction.

In FIG. 15A, in a current operation, the convolution kernel slides for five times at the stride of 2 (stride=2), slides through five points: 5/6/7/8/9, and records a point on which padding is performed, and a location and an address of a point of the data of the input feature map (feature map). A padding replacement table (pad bit-map) and an auxiliary mask table are generated, to record a location and a valid point at which the convolution kernel currently slides in the entire small matrix.

When the data of the feature map is filled in the level-1 buffer of the L1 align buffer after the data of the feature map is read from the L1 memory, the data of the feature map goes through points on which the padding is performed and that are recorded in the padding replacement table and the mask table. A fixed value (configured in the padding SRP) is used for padding, so that padding data can be generated online.

Specifically, two steps are included: (1) Displace the padding replacement table based on the mask table. (2) Based on the valid point in the mask table, extract a valid part and then perform a padding operation.

Further, for a reverse process of converting the matrix into the 3D input dataset, that is, an Img2Col process described above and a Col2Img process are reverse processes. Both the Img2Col process and the Col2Img process may be implemented by the operation accelerators (the operation accelerators in FIG. 7, FIG. 8, and FIG. 10) provided in the embodiments of the present invention, namely, a same hardware structure. That is, both a data writing process (Img2Col) and a data reading process (Col2Img) may exist between the matrix converter and the third memory. A read control line, a write control line, a read data transmission line, and a write data transmission line are required, for example, as shown in FIG. 10, forward ctrl and forward data, and reverse ctrl and reverse data.

For example, virtual 3D dataset space with all 0 is first allocated. The space is also space of a target dataset, and a size of the space is a size of the input dataset. A small matrix is generated by using Img2Col (a process is the same as the foregoing Img2col process). In addition, the target matrix (Delta matrix) is also divided into small matrices in a same manner (generated offline or by another component of a processor through calculation). Two small matrices in corresponding locations are taken out, and element wise addition is performed on the two small matrices. A result matrix is written back into the 3D dataset space. Written-back parameters (including an address, a size, sliding, and concatenation) are consistent with content in the first instruction, and no additional calculation is required. The process may be performed along a column direction, so that there is no dependency relationship between parameters of two matrices before and after, thereby implementing parallel reading and writing. All target matrices are traversed and written back in a column by column manner, to complete a reverse process of converting the target matrices into the 3D dataset.

Figure 16:
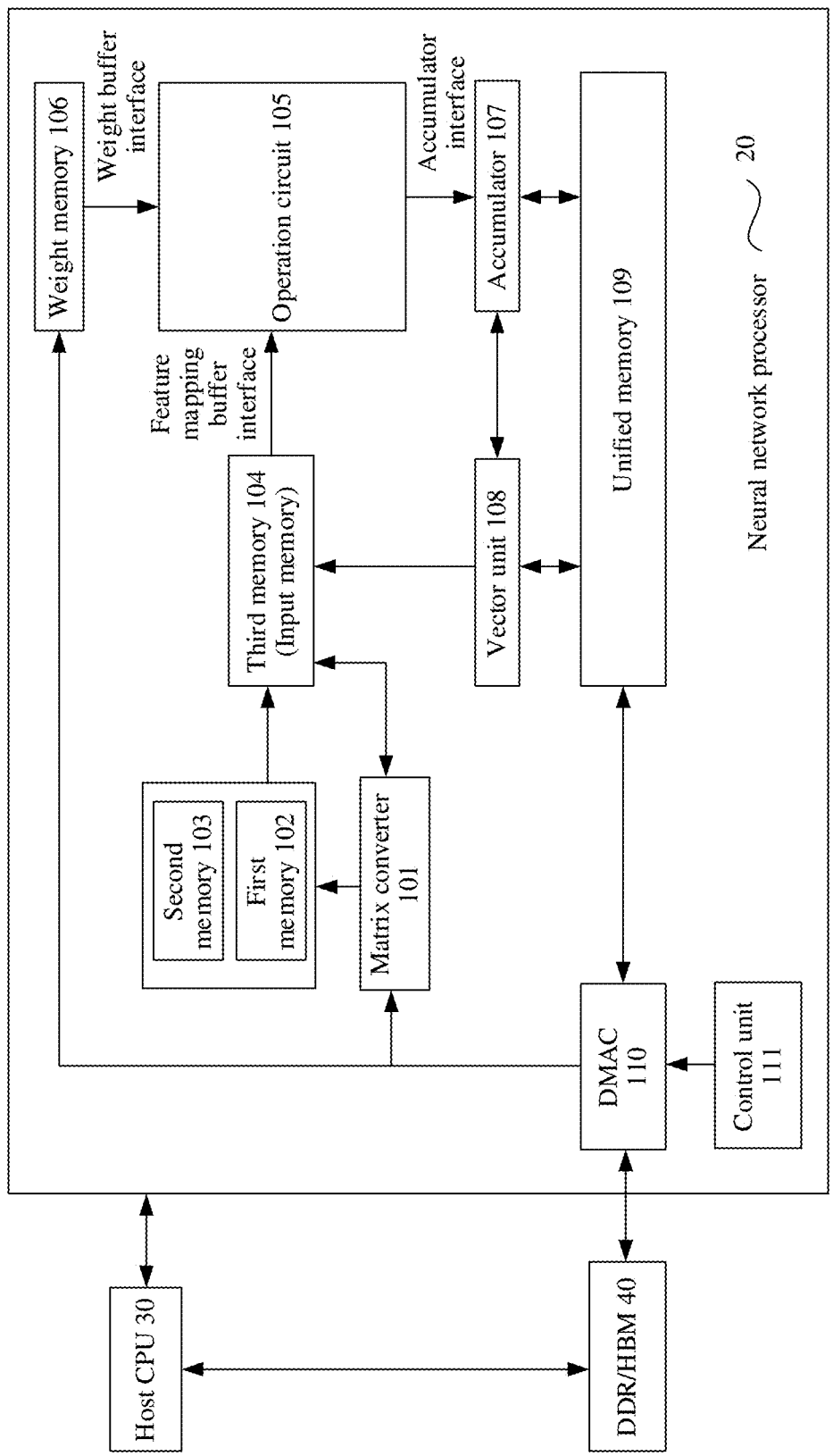
FIG. 16 is a schematic diagram of a hardware structure of a neural network processor according to an embodiment of the present invention.

Based on the foregoing descriptions, the following describes, with reference to the operation accelerator 10 provided in the embodiments of the present invention, a possible embodiment in which the operation accelerator 10 is applied to a neural network processor. FIG. 16 is a schematic diagram of a hardware structure of a neural network processor according to an embodiment of the present invention. The neural network processor NPU 20 is mounted to a CPU 30 (for example, a host CPU) as a coprocessor, and the host CPU 30 allocates a task. A core part of the NPU 20 is the operation circuit 105. A direct memory access controller DMAC 110 controls the operation circuit 105 to extract matrix data in memories (including the input memory 104, the weight memory 106, and the like) to perform a multiplication operation. Further, the DMAC 110 controls an operation result in the operation circuit 105 or matrix data in a unified memory 109 to enter an accumulator 107 and/or a vector unit 108 to perform a further operation.

The operation circuit 105 may also be referred to as a matrix arithmetic unit (Cube Unit), and is configured to complete a matrix*matrix operation. The operation circuit 105 may include a plurality of processing units (Process Engine, PE). In a possible implementation, the operation circuit 105 is a two-dimensional systolic array. Optionally, the operation circuit 105 may alternatively be a one-dimensional systolic array or another electronic circuit that can perform mathematical operations such as multiplication and addition. In some implementations, the operation circuit 1203 is a general-purpose matrix processor.

The vector unit (Vector Unit) 108 is configured to perform further processing such as vector multiplication, vector addition, an exponent operation, a logarithm operation, or value comparison on an output of the operation circuit 105. The vector unit 108 is mainly used for neural network non-convolution/FC layer network calculation, such as pooling (Pooling), batch normalization (Batch Normalization), and local response normalization (Local Response Normalization). In some implementations, the vector unit 108 can store, in the unified memory 109, an output vector that has been processed. For example, the vector unit 108 may apply a non-linear function to the output of the operation circuit 105, for example, to a vector of an accumulated value, to generate an activation value. In some implementations, the vector unit 108 generates a normalized value or a combined value, or the vector unit 108 generates a normalized value and a combined value. In some implementations, the processed output vector can be used as an activation input of the operation circuit 105, for example, can be used at a subsequent layer on the neural network.

The unified memory 109 may also be referred to as an on-chip buffer (On-chip buffer), and is configured to store input data and output data. Weight data (weight matrix) is transferred to the weight memory 106 by using the DMAC 110. An input matrix (input matrix) is also transferred to the unified memory 109 or an input memory 104 by using the DMAC.

The third memory 104 is the input memory, may also be referred to as a feature map memory (Feature map buffer), and is configured to store a feature map matrix. The third memory 104 is configured to receive the target matrix (namely, the n row vectors) transmitted by the second memory in the embodiments of the present invention.

For functions of the matrix converter 102, the first memory 102, and the second memory 103, refer to the descriptions of the related embodiments in FIG. 7 to FIG. 15A, FIG. 15B, and FIG. 15C. Details are not described herein again.

The weight memory (Weight Buffer) 106 is configured to store the weight matrix. A format of the weight matrix includes four dimensions: a height of a convolution kernel, a width of the convolution kernel, a quantity of input channels (a depth of the convolution kernel), and a quantity of output channels (a quantity of convolution kernels). When a convolutional layer performs convolution by using only one convolution kernel, the weight matrix is the convolution kernel. When the convolutional layer performs the convolution by using two or more convolution kernels, the weight matrix may be a matrix including convolution kernels used by the convolutional layer to perform the convolution.

The direct memory access controller (DMAC) 110 is configured to transfer the input data or an input matrix in an external memory 40 to various memories (buffer), for example, transfer the weight data to the weight memory 106 or transfer the input data to the third memory (input memory) 104. Alternatively, the DMAC 110 transfers the output data from the unified memory 109 to a DDR/HBM. Optionally, a complete DMA transmission process includes four steps: a DMA request, a DMA response, DMA transmission, and DMA ending. The external memory 40 may be a double data rate synchronous dynamic random access memory (DDR), a high bandwidth memory (HBM), or the like.

A control unit (Flow control) 111 is configured to control a processing process and control the data reading manner.

It should be noted that the unified memory 109, the input memory 104, and the weight memory 106 are all on-chip memories. The external memory, namely, the DDR/HBM, may be private to a hardware architecture of the CNN 20, or may further serve another processor in a case in which the CNN 20 is served. It may be understood that the host CPU 30 is further configured to run general-purpose operating system software, and control, under action of the general-purpose operating system software, the neural network processor 20 to perform neural network training.

Optionally, the neural network processor 20 may also be integrated into the host CPU 30 as a part of the host CPU 30, or may be another function chip that is coupled to the host CPU 30 and that can implement a related function. Similarly, functions executed by the host CPU 30 may also be distributed on a plurality of different function chips for execution. This is not specifically limited in this embodiment of the present invention.

Based on the foregoing structure, for example, it is assumed that there is an input matrix A, a weight matrix B, and an output matrix C. The operation circuit 105 fetches data corresponding to the matrix B from the weight memory 106 and buffers the data on each PE of the operation circuit. The operation circuit 105 fetches data of the matrix A from the input memory 104, performs a matrix operation with the data of the matrix A and the matrix B. Then the operation circuit 105 performs an addition operation in the accumulator 107, to obtain a partial result or a final result of a matrix, and stores the partial result or the final result in the unified memory 109.

It may be understood that the foregoing hardware structure of the CNN is merely an example of the hardware structure provided in this embodiment of the present invention. The hardware structure of the CNN in this embodiment of the present invention includes but is not limited to the foregoing structure and connection relationship.

Figure 17:
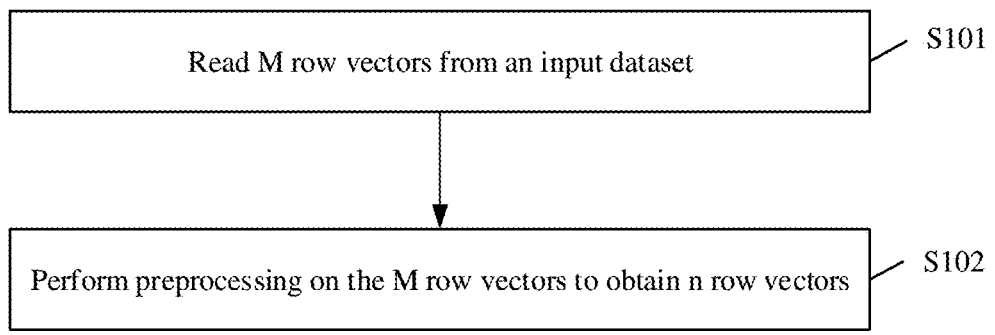
FIG. 17 is a schematic flowchart of a data processing method according to an embodiment of the present invention.

FIG. 17 is a schematic flowchart of a data processing method according to an embodiment of the present invention. The method may be applied to the operation accelerator in FIG. 7, FIG. 8, or FIG. 10, or the neural network processor in FIG. 16. The method may include the following steps S101 to S102.

Step S101: Read M row vectors from an input dataset.

The input dataset includes S row vectors. Each of the S row vectors includes C0 pieces of data. The C0 pieces of data are data that is corresponding to an element Aij in an input feature map and that is on C0 consecutive channels in a C direction. A size of the input feature map is W*H*C. W is a width, H is a height, and C is a quantity of channels. Aij is an element in an $i^{th}$ row and a $j^{th}$ column on a W*H plane of the input feature map. i is a positive integer less than or equal to W, and j is a positive integer less than or equal to H. The M row vectors are M row vectors in a target matrix. A size of the target matrix is N*C0. N row vectors in the target matrix are row vectors corresponding to N elements $A_{ij}$, when a convolution kernel continuously slides on the W*H plane of the input feature map for N times, that are corresponding to an element $W_{mn}$ in the convolution kernel and that are on the W*H plane. $W_{mn}$ is an element in an $m^{th}$ row and an $n^{th}$ column in the convolution kernel. M is an integer less than or equal to S, N is an integer greater than or equal to M, and C0 is an integer less than or equal to C.

Step S102: Perform preprocessing on the M row vectors to obtain n row vectors.

The preprocessing includes one or more of sliding, concatenation, and padding. The n row vectors include the M row vectors and (n−M) padding row vectors. The n row vectors are the N row vectors in the target matrix. A storage sequence of the n row vectors in the second memory is consistent with a sequence of the N row vectors in the target matrix.

In a possible implementation, when N is greater than M, the N row vectors in the target matrix are specifically row vectors corresponding to N elements Aj, when the convolution kernel continuously slides on a padded W*H plane of the input feature map for N times, that are corresponding to the element $W_{mn}$ in the convolution kernel and that are on the padded W*H plane. The performing preprocessing on the M row vectors to obtain n row vectors includes padding the (n−M) padding row vectors with fixed values, and obtaining the n row vectors after the sliding or concatenation is performed on the M row vectors and the (n−M) padding row vectors.

In a possible implementation, the S row vectors are data corresponding to consecutive S pieces of $A_{ij}$ on the C0 consecutive channels in the C direction, and the S pieces of Aj are first in a W direction and then in an H direction in the input feature map.

In a possible implementation, the reading the M row vectors from an input dataset includes reading the M row vectors from the S row vectors according to a read instruction. The read instruction includes a read enable, a read address, a read stride, and a read size. The read stride is equal to a sliding stride of the convolution kernel.

In a possible implementation, the method further includes performing a reverse operation on the n row vectors to obtain the M row vectors through restoration, where the reverse operation includes one or more of sliding, splitting, and de-padding, and restoring locations of the M row vectors in the S row vectors according to the read instruction for reading the M row vectors from the input dataset, where the read instruction includes the read enable, the read address, the read stride, and the read size.

It should be noted that for a specific procedure in the data processing method described in this embodiment of the present invention, refer to related descriptions in the embodiments of the present invention in FIG. 1 to FIG. 6. Details are not described herein again.

An embodiment of the present invention further provides a computer storage medium. The computer storage medium stores a program, and when being executed, the program includes some or all of the steps described in any one of the foregoing method embodiments.

An embodiment of the present invention further provides a computer program, and the computer program includes an instruction. When a computer executes the computer program, the computer may be enabled to perform some or all of the steps of any one of the data processing methods.

In the foregoing embodiments, the description of each embodiment has respective focuses. For a part that is not described in detail in an embodiment, refer to related descriptions in other embodiments.

It should be noted that, for brief description, the foregoing method embodiments are represented as a series of actions. However, persons skilled in the art should appreciate that this application is not limited to the described order of the actions, because according to this application, some steps may be performed in other orders or simultaneously. It should be further appreciated by persons skilled in the art that the embodiments described in this specification all belong to embodiments, and the involved actions and modules are not necessarily required by this application.

In the several embodiments provided in this application, it should be understood that the disclosed apparatus may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a magnetic disk, an optical disc, a read-only memory (ROM), or a random access memory (RAM).

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An operation accelerator, comprising:
a matrix converter;
a first memory; and
a second memory coupled to the matrix converter;
wherein the first memory is configured to store an input dataset, the input dataset comprises S row vectors, each of the S row vectors comprises C0 pieces of data, and the C0 pieces of data correspond to an element $A_{ij}$ in an input feature map that is on C0 consecutive channels in a C direction, wherein a size of the input feature map is $W*H*C$, W is a width of the input feature map, H is a height of the input feature map, and C is a quantity of channels of the input feature map, $A_{ij}$ is an element in an ith row and a jth column on a $W*H$ plane of the input feature map, i is a positive integer less than or equal to W, and j is a positive integer less than or equal to H;
wherein the matrix converter is configured to:
read M row vectors from the input dataset, wherein the M row vectors are M row vectors in a target matrix, a size of the target matrix is $N*C0$, N row vectors in the target matrix correspond to N elements $A_{ij}$, when a convolution kernel continuously slides on the $W*H$ plane of the input feature map for N times, that correspond to an element $W_{mn}$ in the convolution kernel and that are on the $W*H$ plane, and $W_{mn}$ is an element in an mth row and an nth column in the convolution kernel, and wherein M is an integer less than or equal to S, N is an integer greater than or equal to M, and C0 is an integer less than or equal to C;
generate a first instruction, wherein the first instruction comprises an instruction for performing preprocessing on the M row vectors, and the preprocessing comprises one or more of sliding, concatenation, or padding; and
send the M row vectors and the first instruction to the second memory; and
wherein the second memory is configured to:
perform, according to the first instruction, the preprocessing on the M row vectors to obtain n row vectors; and
store the n row vectors, wherein the n row vectors comprise the M row vectors and (n−M) padding row vectors, the n row vectors are the N row vectors in the target matrix, and a storage sequence of the n row vectors in the second memory is consistent with a sequence of the N row vectors in the target matrix.

2. The operation accelerator according to claim 1, wherein N is greater than M, and the N row vectors in the target matrix correspond to N elements $A_{ij}$, when the convolution kernel continuously slides on a padded $W*H$ plane of the input feature map for N times, that correspond to the element $W_{mn}$ in the convolution kernel and that are on the padded $W*H$ plane; and
wherein the second memory is further configured to:
pad the (n−M) padding row vectors with fixed values; and
perform, according to the first instruction, a displacement or concatenation operation on the M row vectors and the (n−M) padding row vectors to obtain the n row vectors, and store the n row vectors.

3. The operation accelerator according to claim 1, further comprising:
a third memory coupled to the matrix converter; and
an operation circuit coupled to the third memory;
wherein the matrix converter is further configured to:
send, to the third memory for P times, the n row vectors stored in the second memory and a corresponding second instruction generated by the matrix converter, wherein P is an integer greater than or equal to 1, and the second instruction comprises a write enable, a write address, and a write size;
wherein the third memory is configured to:
store $P*n$ row vectors according to the corresponding second instruction; and
send the $P*n$ row vectors to the operation circuit, wherein a storage sequence, in the third memory, of n row vectors that are received at each time in the n row vectors received for the P times is consistent with a sequence of the corresponding N row vectors in the target matrix, and storage sequences, in the third memory, of the n row vectors that are received for P times are consistent with receiving sequences of the n row vectors that are received for P times; and
wherein the operation circuit is configured to perform matrix operations on the $P*n$ row vectors.

4. The operation accelerator according to claim 1, wherein the S row vectors are data corresponding to consecutive S pieces of $A_{ij}$ on the C0 consecutive channels in the C direction, and the S pieces of $A_{ij}$ are first in a W direction and then in an H direction in the input feature map.

5. The operation accelerator according to claim 1, wherein the matrix converter is further configured to:
read the M row vectors from the S row vectors according to a read instruction, wherein the read instruction comprises a read enable, a read address, a read stride, and a read size, and the read stride is equal to a sliding stride of the convolution kernel.

6. The operation accelerator according to claim 5, wherein the matrix converter is further configured to:
perform, based on the n row vectors stored in the second memory and the first instruction, a reverse operation on the n row vectors to obtain the M row vectors through restoration, wherein the reverse operation comprises one or more of sliding, splitting, or de-padding; and
restore locations of the M row vectors in the S row vectors according to the read instruction for reading the M row vectors from the input dataset.

7. The operation accelerator according to claim 1, wherein the preprocessing comprises sliding.

8. The operation accelerator according to claim 1, wherein the preprocessing comprises padding.

9. The operation accelerator according to claim 1, wherein the preprocessing comprises concatenation.

10. The operation accelerator according to claim 1, wherein the preprocessing comprises sliding and concatenation.

11. A method, comprising:
  storing an input dataset in a first memory of an operation accelerator, wherein the input dataset comprises S row vectors, each of the S row vectors comprises C0 pieces of data, and the C0 pieces of data correspond to an element Aij in an input feature map that is on C0 consecutive channels in a C direction, wherein a size of the input feature map is W*H*C, W is a width of the input feature map, H is a height of the input feature map, and C is a quantity of channels of the input feature map, Aij is an element in an ith row and a jth column on a W*H plane of the input feature map, i is a positive integer less than or equal to W, and j is a positive integer less than or equal to H;
  reading, by a matrix converter of the operation accelerator, M row vectors from the input dataset, wherein the M row vectors are in a target matrix, a size of the target matrix is N*C0, N row vectors in the target matrix correspond to N elements Aij, when a convolution kernel continuously slides on the W*H plane of the input feature map for N times, that correspond to an element Wmn in the convolution kernel and that are on the W*H plane, and Wmn is an element in an mth row and an nth column in the convolution kernel, and wherein M is an integer less than or equal to S, N is an integer greater than or equal to M, and C0 is an integer less than or equal to C;
  generating a first instruction by the matrix converter, wherein the first instruction comprises an instruction for performing preprocessing on the M row vectors, and the preprocessing comprises one or more of sliding, concatenation, or padding;
  sending, by the matrix converter, the M row vectors and the first instruction to a second memory of the operation accelerator;
  performing preprocessing on the M row vectors, by the second memory, to obtain n row vectors; and
  storing the n row vectors, by the second memory, wherein the n row vectors comprise the M row vectors and (n−M) padding row vectors, the n row vectors are the N row vectors in the target matrix, and a storage sequence of the n row vectors is consistent with a sequence of the N row vectors in the target matrix.

12. The method according to claim 11, wherein when N is greater than M, the N row vectors in the target matrix are row vectors corresponding to N elements Aij, when the convolution kernel continuously slides on a padded W*H plane of the input feature map for N times, that correspond to the element Wmn in the convolution kernel and that are on the padded W*H plane; and
  wherein performing preprocessing on the M row vectors, by the second memory, to obtain the n row vectors comprises:
    padding the (n−M) padding row vectors with fixed values; and
    obtaining the n row vectors after the sliding or concatenation is performed on the M row vectors and the (n−M) padding row vectors.

13. The method according to claim 11, wherein the S row vectors are data corresponding to consecutive S pieces of Aij on the C0 consecutive channels in the C direction, and the S pieces of Aij are first in a W direction and then in an H direction in the input feature map.

14. The method according to claim 11, wherein reading by the matrix converter of the operation accelerator, the M row vectors from the input dataset comprises:
  reading the M row vectors from the S row vectors according to a read instruction, wherein the read instruction comprises a read enable, a read address, a read stride, and a read size, and the read stride is equal to a sliding stride of the convolution kernel.

15. The method according to claim 14, further comprising:
  performing a reverse operation on the n row vectors to obtain the M row vectors through restoration, wherein the reverse operation comprises one or more of sliding, splitting, or de-padding; and
  restoring locations of the M row vectors in the S row vectors according to the read instruction for reading the M row vectors from the input dataset.

16. The method according to claim 11, wherein the preprocessing comprises sliding.

17. The method according to claim 11, wherein the preprocessing comprises padding.

18. The method according to claim 11, wherein the preprocessing comprises concatenation.

19. The method according to claim 11, wherein the preprocessing comprises sliding and concatenation.

* * * * *

UNITED STATES PATENT AND TRADEMARK OFFICE
CERTIFICATE OF CORRECTION

PATENT NO. : 12,306,901 B2  
APPLICATION NO. : 17/224643  
DATED : May 20, 2025  
INVENTOR(S) : Liu et al.

Page 1 of 1

It is certified that error appears in the above-identified patent and that said Letters Patent is hereby corrected as shown below:

In the Claims

In Column 21, in Claim 1, Line 32, delete "Cis" and insert -- C is --.

Signed and Sealed this  
Twenty-fourth Day of June, 2025

Coke Morgan Stewart  
*Acting Director of the United States Patent and Trademark Office*